US010146488B2

(12) United States Patent
Takahashi

(10) Patent No.: US 10,146,488 B2
(45) Date of Patent: Dec. 4, 2018

(54) IMAGE FORMING APPARATUS, INFORMATION PROCESSING METHOD, AND SYSTEM

(71) Applicant: Teruaki Takahashi, Kanagawa (JP)

(72) Inventor: Teruaki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/728,549

(22) Filed: Oct. 10, 2017

(65) Prior Publication Data

US 2018/0101343 A1  Apr. 12, 2018

(30) Foreign Application Priority Data

Oct. 11, 2016 (JP) .................. 2016-200101
Aug. 10, 2017 (JP) .................. 2017-156175

(51) Int. Cl.
  *G06F 3/12* (2006.01)
  *H04N 1/00* (2006.01)

(52) U.S. Cl.
  CPC .......... *G06F 3/1236* (2013.01); *G06F 3/1285* (2013.01); *H04N 1/00244* (2013.01)

(58) Field of Classification Search
  None
  See application file for complete search history.

(56) References Cited

U.S. PATENT DOCUMENTS

| 7,895,307 B2* | 2/2011 | Tokishige | G06F 3/1205 |
| | | | 709/223 |
| 9,645,776 B2* | 5/2017 | Yamamoto | G06F 3/1222 |
| 2007/0013945 A1* | 1/2007 | Yoshida | H04N 1/00222 |
| | | | 358/1.15 |
| 2011/0051185 A1 | 3/2011 | Takahashi | |
| 2011/0058208 A1 | 3/2011 | Takahashi | |
| 2013/0027744 A1 | 1/2013 | Takahashi | |
| 2014/0029033 A1 | 1/2014 | Takahashi | |
| 2014/0340713 A1 | 11/2014 | Takahashi | |

(Continued)

FOREIGN PATENT DOCUMENTS

| JP | 2008-027065 | 2/2008 |
| JP | 2011-253294 | 12/2011 |
| JP | 2013-041457 | 2/2013 |

*Primary Examiner* — Thomas D Lee
(74) *Attorney, Agent, or Firm* — Oblon, McClelland, Maier & Neustadt, L.L.P.

(57) ABSTRACT

An image forming apparatus, connectable to a user terminal, includes a memory to store terminal identification information for identifying the user terminal, and file identification information for identifying at least one file printable by the image forming apparatus, and circuitry to report file information including information on the file printable by the image forming apparatus to the user terminal, acquire terminal identification information of the user terminal from the user terminal as a response to the reporting of the file information, determine whether the terminal identification information acquired from the user terminal matches the terminal identification information stored in the memory, and report the file identification information of the at least one file to the user terminal based on a determination that the terminal identification information acquired from the user terminal matches the terminal identification information stored in the memory.

16 Claims, 21 Drawing Sheets

(56) References Cited

U.S. PATENT DOCUMENTS

| | | | |
|---|---|---|---|
| 2015/0036170 A1* | 2/2015 | Miyake | G06F 3/1238 358/1.14 |
| 2016/0255218 A1 | 9/2016 | Takahashi | |
| 2017/0134504 A1 | 5/2017 | Takahashi | |

* cited by examiner

FIG. 6

| USER ID | USER NAME | TERMINAL ID | FILE ID | UPDATED DATE | PRINTED DATE |
|---|---|---|---|---|---|
| U0001 | UserA | T0001 | F0001 | 2016/07/01 12:00:00 | 2016/07/02 15:30:20 |
| | | | F0002 | 2016/07/02 13:15:10 | |
| | | | F0003 | 2016/07/03 16:20:00 | 2016/07/03 17:05:40 |
| | | | ... | ... | ... |
| U0002 | UserB | T0002 | F0010 | 2016/07/01 14:00:00 | 2016/07/03 09:10:25 |
| | | | F0011 | 2016/07/05 17:40:50 | 2016/07/05 13:00:05 |
| | | | ... | ... | ... |
| ... | ... | ... | ... | ... | ... |

FIG. 7

CONNECTION TO COMPUTER

CONNECT TO COMPUTER HAVING SHARED FOLDER.
INPUT COMPUTER NAME OR IP ADDRESS

| COMPUTER NAME OR IP ADDRESS | 10.60.93.168 |

> NEXT

STATUS CHECK　　　　　　　　　　STOP

FIG. 8

INPUT USER NAME AND PASSWORD

| LOGIN ID | user |
| LOGIN PASSWORD | •••• |

RETURN　　　　　　　　　　NEXT

STATUS CHECK　　　　　　　　　　STOP

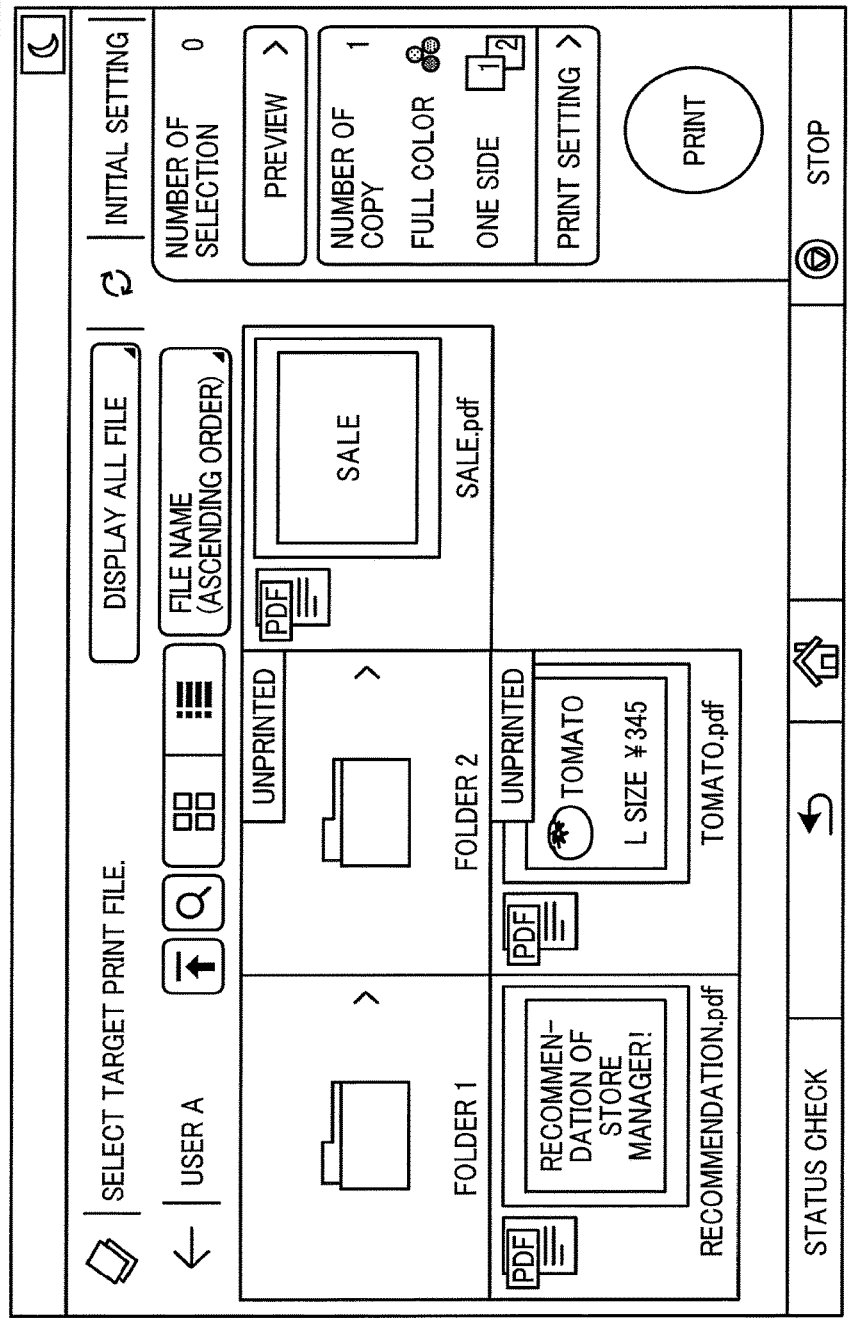

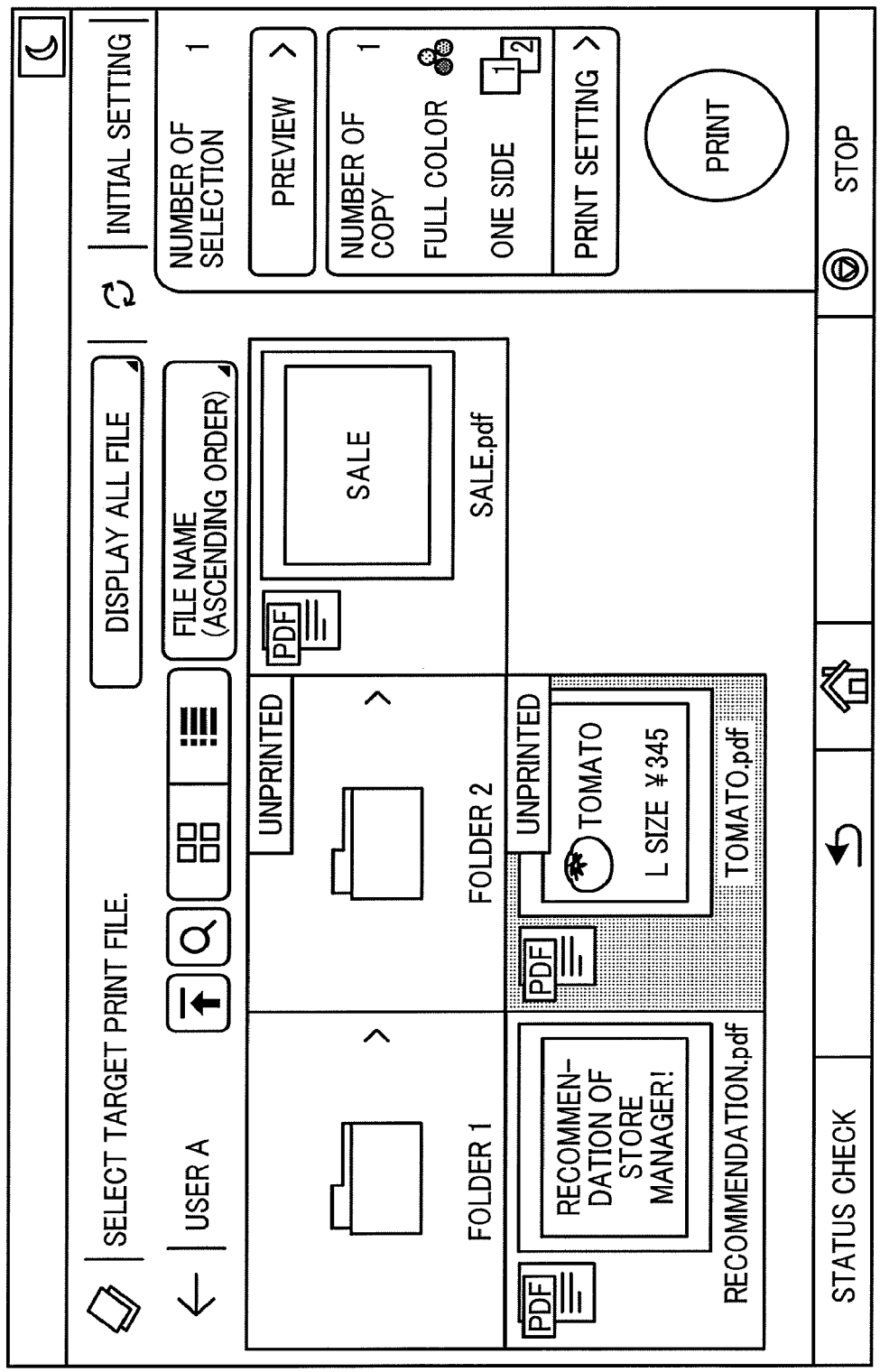

IMAGE FORMING APPARATUS, INFORMATION PROCESSING METHOD, AND SYSTEM

CROSS-REFERENCE TO RELATED APPLICATION

This application claims priority pursuant to 35 U.S.C. § 119(a) to Japanese Patent Application Nos. 2016-200101 filed on Oct. 11, 2016 and 2017-156175 filed on Aug. 10, 2017 in the Japan Patent Office, the disclosure of which is incorporated by reference herein in its entirety.

BACKGROUND

Technical Field

This disclosure relates to an image forming apparatus, an information processing method, and a system.

Background Art

Conventionally, an image forming apparatus connected to a file server can acquire a file from the file server and print the file. In this technique, printed date can be managed for each file on the file server, and if there is an unprinted file, the unprinted file can be highlighted. One conventional technology discloses a system that performs document management with a file server, in which a new arrival notification of a document is notified to a personal computer (PC), and if the file server does receive a confirmation response indicating that the PC has received the new arrival notification from the PC after a predetermined time has elapsed after the notification to the PC, the new arrival notification is reported again to the PC. Another conventional technology discloses a system that sets attributes indicating that a file is not a new arrival document, and performs the new arrival notification except for documents set with the attributes.

SUMMARY

As one aspect of the present invention, an image forming apparatus, connectable to a user terminal, is devised. The image forming apparatus includes a memory to store terminal identification information for identifying the user terminal, and file identification information for identifying at least one file printable by the image forming apparatus, and circuitry to report file information including information on the file printable by the image forming apparatus to the user terminal, acquire terminal identification information of the user terminal from the user terminal as a response to the reporting of the file information, determine whether the terminal identification information acquired from the user terminal matches the terminal identification information stored in the memory, and report the file identification information of the at least one file to the user terminal based on a determination that the terminal identification information acquired from the user terminal matches the terminal identification information stored in the memory.

As another aspect of the present invention, a method of processing information by an image forming apparatus, connectable to a user terminal is devised. The method includes storing, in a memory, terminal identification information for identifying the user terminal, and file identification information for identifying at least one file printable by the image forming apparatus, reporting file information including information on the file printable by the image forming apparatus to the user terminal, acquiring terminal identification information of the user terminal from the user terminal as a response of reporting the file information to the user terminal, determining whether the terminal identification information acquired from the user terminal matches the terminal identification information stored in the memory, and reporting the file identification information of the at least one file to the user terminal based on a determination that the terminal identification information acquired from the user terminal matches the terminal identification information stored in the memory.

As another aspect of the present invention, a system is devised. The system includes a user terminal, and an image forming apparatus connectable to the user terminal. The image forming apparatus includes a memory to store terminal identification information for identifying the user terminal, and file identification information for identifying at least one file printable by the image forming apparatus, and circuitry to report file information including information on the file printable by the image forming apparatus to the user terminal, acquire terminal identification information of the user terminal from the user terminal as a response to the reporting of the file information, determine whether the terminal identification information acquired from the user terminal matches the terminal identification information stored in the memory, and report the file identification information of the at least one file to the user terminal based on a determination that the terminal identification information acquired from the user terminal matches the terminal identification information stored in the memory.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 6 is an example of information stored in an image forming apparatus of the first embodiment;

FIG. 7 is an example of a screen used for inputting an address of a file server of the first embodiment;

FIG. 8 is an example of a login screen to a file server of the first embodiment;

FIGS. 19A and 19B illustrate examples of a file list screen of the first embodiment;

DETAILED DESCRIPTION

Figure 1:
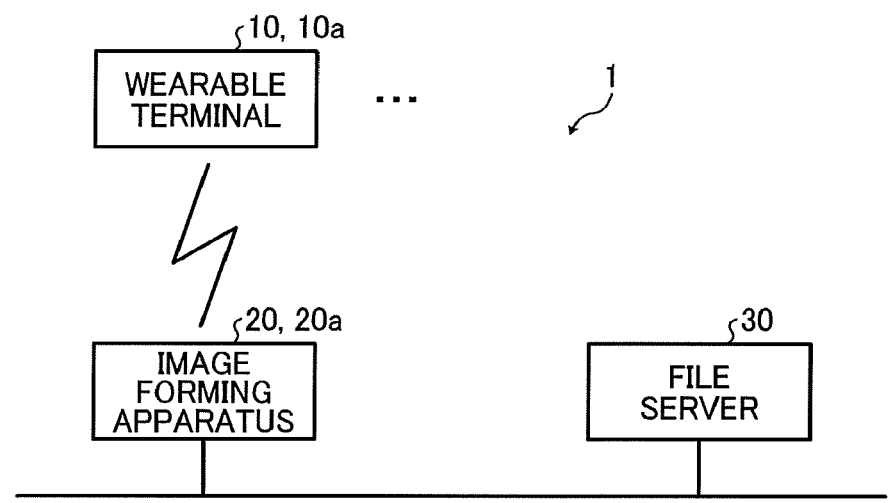
FIG. 1 is an example of a system configuration of an information processing system of a first embodiment.

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

A description is given of an image forming apparatus, an information processing method, and a system for processing information of one or more embodiments of the present invention with reference to drawings. It should be noted that the present invention is not limited to the embodiments described in this specification.

(First Embodiment)
(System Configuration)

A description is given of a system configuration of an information processing system 1 of a first embodiment with reference to FIG. 1. FIG. 1 is an example of a system configuration of the information processing system 1 of the first embodiment.

As illustrated in FIG. 1, the information processing system 1 includes, for example, a wearable terminal 10, an image forming apparatus 20, and a file server 30. The number of the wearable terminal 10, the image forming apparatus 20, and the file server 30 can be one or more in the information processing system 1. For example, in the information processing system 1, the image forming apparatus 20 acquires one or more files stored or accumulated in the file server 30, and prints the acquired files. In the information processing system 1, the wearable terminal 10 requests various information related to printing of files to the image forming apparatus 20, and displays the various information on a display of the wearable terminal 10.

The wearable terminal 10 is an example of a user terminal, which can be used as a client terminal for the image forming apparatus 20 that performs operations such as printing, and the wearable terminal 10 can be worn by a user such as on a wrist of a user, which can be used as a user-worn device. The wearable terminal 10 can be worn by each of users that uses the image forming apparatus 20. The wearable terminal 10 is installed with one or more applications used for connecting the wearable terminal 10 to the image forming apparatus 20 by wireless communication, and the wearable terminal 10 logs in and requests various processing or operations to the image forming apparatus 20. In the first embodiment, Bluetooth (registered trademark) can be used as wireless communication between the wearable terminal 10 and the image forming apparatus 20. For example, it is assumed that Bluetooth Low Energy (BLE: registered trademark) added for Bluetooth 4.0 is used, but not limited thereto. For example, the personal area network (PAN) wireless media such as Classic Bluetooth before Bluetooth 3.x can be used. When Classic Bluetooth is used, the pairing can be performed for the wearable terminal 10 and the image forming apparatus 20.

The image forming apparatus 20 is, for example, a multi-functional apparatus such as a multi-function peripheral (MFP), and a printer having functions of accessing the file server 30, downloading one or more files from the file server 30, and printing one or more files. The image forming apparatus 20 and the file server 30 can be connected with each other via a network wirelessly and/or by wire. When the image forming apparatus 20 receives various requests from the wearable terminal 10, the image forming apparatus 20 performs various processing matched to the various requests. The file server 30 stores information such as file identifications (IDs) used as file identification information for identifying each of files managed by the file server 30, file names of each of the files managed by the file server 30, and updated date of each of the files managed by the file server 30. Further, the image forming apparatus 20 can be configured to periodically access the file server 30 to generate and maintain a file list including information such as file IDs for identifying each of the files, file names of each of the files, and updated date of each of the files managed by the file server 30. In this example configuration, when a file is printed by the image forming apparatus 20, the image forming apparatus 20 can acquire printed date information of the printed file, in which the image forming apparatus 20 can recognize whether an unprinted file exists. With this configuration, the image forming apparatus 20 generates and maintains an unprinted file list related to unprinted files. The unprinted file list can be updated when the file list is generated. The file server 30 is, for example, a personal computer (PC) and a server that accumulates files.

In the above described configuration, the image forming apparatus 20 includes, for example, a storage unit that stores a terminal identification (ID) used for identifying the wearable terminal 10, one or more file IDs used for identifying one or more files managed by the file server 30, updated date information indicating a updated date of one or more files managed by the file server 30, and printed date information indicating a printed date of one or more files managed by the file server 30 by linking or associating the terminal ID, the file ID, the updated date information, and the printed date information one to another. The image forming apparatus 20 transmits information indicating that one or more unprinted files exists in the files managed by the file server 30 based on the unprinted file list to the wearable terminal 10, in which the image forming apparatus 20 transmits file information of one or more files that can be printed by the image forming apparatus 20 to the wearable terminal 10. For example, when BLE (registered trademark) is used, the image forming apparatus 20 transmits an advertisement packet including information indicating that one or more unprinted files exist to the wearable terminal 10. The advertisement packet is a broadcasted packet, and thereby the advertisement packet can be received by a plurality of the wearable terminals 10 used in the information processing system 1. In this configuration, the advertisement packet including information indicating that one or more unprinted files exist can be used as a new arrival notification of one or more unprinted files. Hereinafter, the unprinted file indicates one unprinted file or a plural of unprinted files.

When the wearable terminal 10 receives the new arrival notification, the wearable terminal 10 displays a screen used for selecting a connection with the image forming apparatus 20 that has transmitted the new arrival notification. A user performs a connection selection operation on the screen whether the wearable terminal 10 is to be connected to the image forming apparatus 20. When the user selects to connect the wearable terminal 10 to the image forming apparatus 20, the wearable terminal 10 is connected to the selected image forming apparatus 20. For example, when BLE (registered trademark) is used, the wearable terminal 10 starts to establish the connection using Generic Attribute (GATT) Profile to enable communication with the image forming apparatus 20. Then, the wearable terminal 10 transmits a requests for confirming unprinted file to the connected image forming apparatus 20 such as a requests for acquiring unprinted file. In this configuration, the unprinted file request includes the terminal ID of the wearable terminal 10. The terminal ID of the wearable terminal 10 is, for example, Universally Unique Identifier (UUID) generated by the wearable terminal 10.

When the image forming apparatus 20 receives the unprinted file request including the terminal ID of the wearable terminal 10 from the wearable terminal 10, the image forming apparatus 20 determines whether the terminal ID of the wearable terminal 10 is stored in the storage unit of the image forming apparatus 20. When the terminal ID of the wearable terminal 10 is stored in the storage unit of the image forming apparatus 20, the image forming apparatus 20 extracts a file ID of a unprinted file based on the updated date information and the printed date information linked or associated with the terminal ID of the wearable terminal 10 from the storage unit of the image forming apparatus 20. In this configuration, the image forming apparatus 20 determines whether the terminal ID acquired from the wearable terminal 10 matches the terminal ID information stored in the storage unit. By contrast, when the terminal ID of the wearable terminal 10 is not stored in the storage unit of the image forming apparatus 20, the image forming apparatus 20 disconnects or terminates a connection with the wearable terminal 10. Further, when the terminal ID of the wearable terminal 10 is stored in the storage unit of the image forming apparatus 20, the image forming apparatus 20 reports unprinted file information including file name information indicating a file name linked or associated with the extracted file ID of the unprinted file to the wearable terminal 10. Further, after the image forming apparatus 20 reports the unprinted file information to the wearable terminal 10, the image forming apparatus 20 disconnects or terminates a connection with the wearable terminal 10. With these processing, when the wearable terminal 10 receives the unprinted file information, the wearable terminal 10 displays a file name of the unprinted file.

In this configuration, when the advertisement packet including information indicating that the unprinted file exists is transmitted from the image forming apparatus 20 to the wearable terminal 10, the image forming apparatus 20 acquires the terminal ID from the wearable terminal 10 connected to the image forming apparatus 20. Then, the image forming apparatus 20 identifies one or more unprinted files based on the updated date information and printed date information of the one or more files linked or associated with the acquired terminal ID, and then reports the unprinted file information including the file name information of the one or more unprinted files to the wearable terminal 10. After reporting the unprinted file information, the image forming apparatus 20 disconnects or terminates a connection with the wearable terminal 10. As a result, the image forming apparatus 20 can suitably transmits the new arrival notification to the wearable terminal 10, which is not always connected to the network. In other word, when the image forming apparatus 20 transmits the new arrival notification using a broadcasted packet, the image forming apparatus 20 connects with the wearable terminal 10 that has requested the unprinted file information, and then the image forming apparatus 20 disconnects the connection with the wearable terminal 1 after reporting the unprinted file information to the wearable terminal 10, with which the image foaming apparatus 20 can be configured to transmit the new arrival notification to the wearable terminal 10 that is not always connected to the network while reducing the wireless communication connection load with the wearable terminal 10.

(Hardware Configuration)

Figure 2:
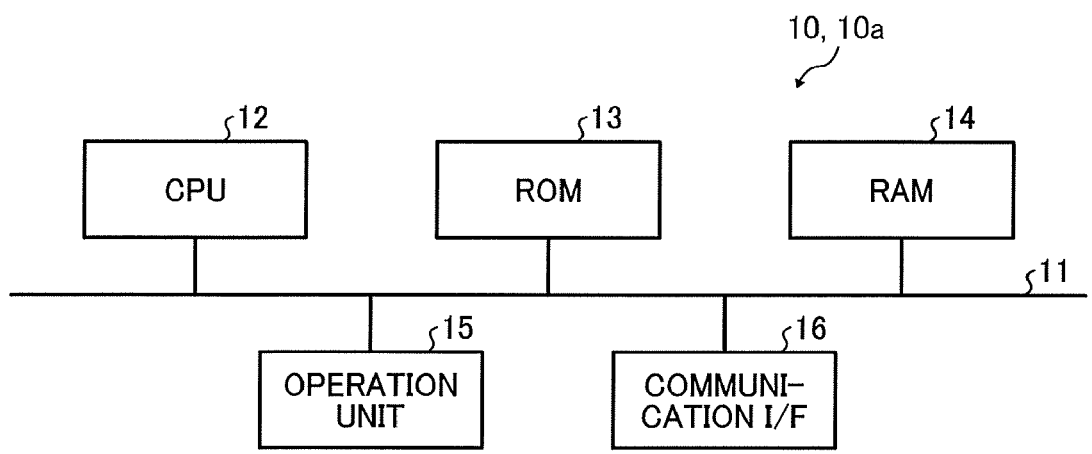
FIG. 2 is an example of a block diagram of a hardware configuration of a wearable terminal of the first embodiment.

A description is given of a hardware configuration of the wearable terminal 10 of the first embodiment with reference to FIG. 2. FIG. 2 is an example of a block diagram of a hardware configuration of the wearable terminal 10 of the first embodiment.

As illustrated in FIG. 2, the wearable terminal 10 includes, for example, a central processing unit (CPU)12, a read only memory (ROM) 13, a random access memory (RAM) 14, an operation unit 15, and a communication interface (I/F) 16. Each of these units are connected one to another via a system bus 11.

The CPU 12 controls operations of the wearable terminal 10 entirely. For example, the CPU 12 executes one or more programs stored in the ROM 13 and loaded on the RAM 14 used as a work area to control the operations of the wearable terminal 10 entirely. The operation unit 15 includes, for example, a touch panel and hard keys. The operation unit 15 receives an input of information to the wearable terminal 10, and displays various screens. The operation unit 15 can be also referred to as the display/operation unit. The communication I/F 16 is used as an interface for communicating with an external apparatus such as the image forming apparatus 20. For example, as to the communication using the communication I/F 16, a wireless medium that can be controlled by an application such as Bluetooth 4.0 that pairing is optional can be used, but PAN wireless medium requiring the pairing such as Classic Bluetooth can be used. Further, in addition to these, the wearable terminal 10 can include, for example, various sensors that can measure biomedical information and position information of a user wearing the wearable terminal 10.

Figure 3:
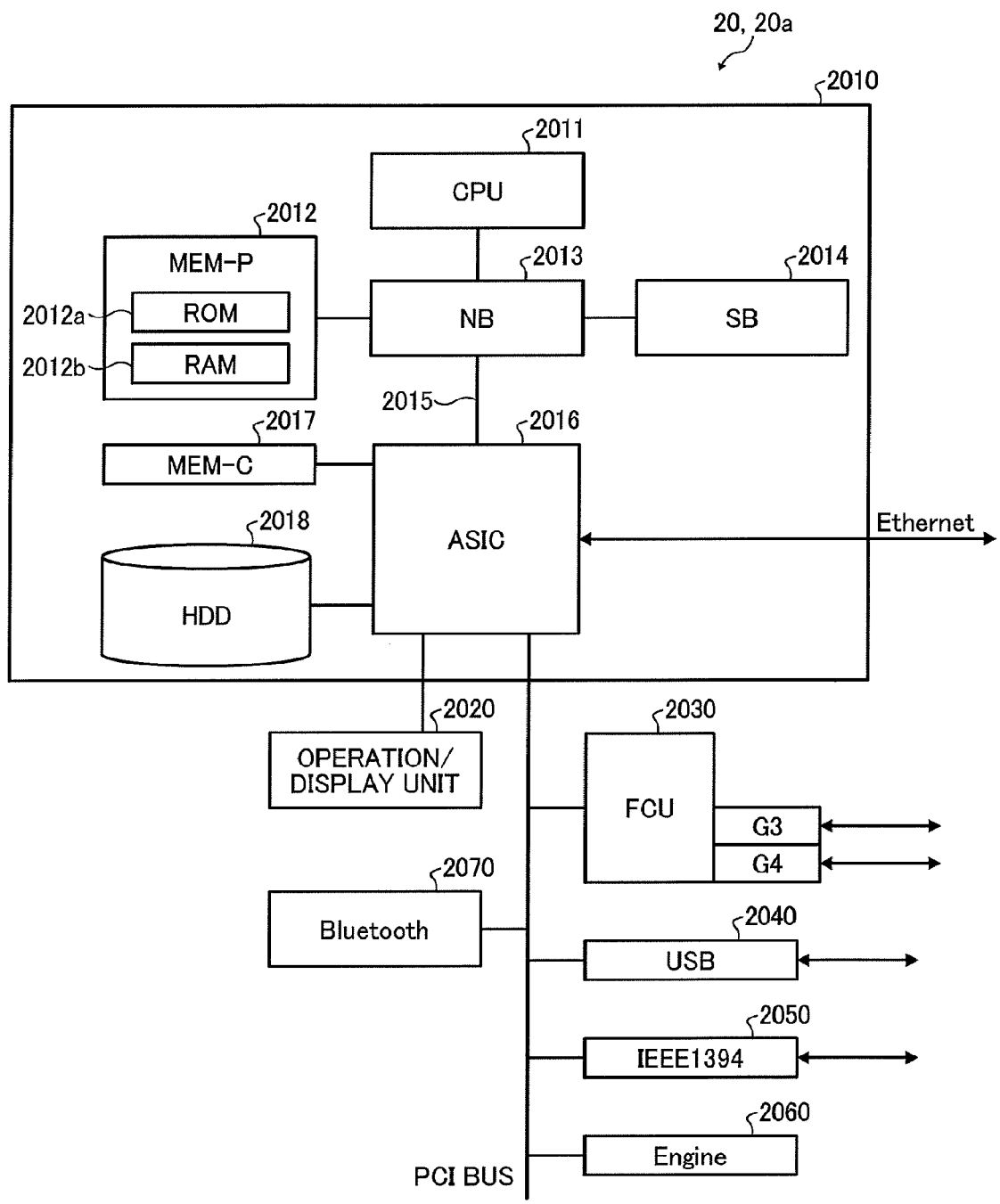
FIG. 3 is an example of a block diagram of a hardware configuration of an image forming apparatus of the first embodiment.

A description is given of a hardware configuration of the image forming apparatus 20 of the first embodiment with reference to FIG. 3. FIG. 3 is an example of a block diagram of a hardware configuration of the image forming apparatus 20 of the first embodiment.

As illustrated in FIG.3, the image forming apparatus 20 includes, for example, a controller 2010, and an engine 2060 connected with each other by a peripheral component interconnect (PCI) bus. The controller 2010 controls the image forming apparatus 20 entirely. For example, the controller 2010 controls drawing, communication, and an input from an operation/display unit 2020. The engine 2060 is, for example, a printer engine connectable to a PCI bus. For example, the engine 2060 includes a black and white plotter, a one-drum color plotter, a four-drum color plotter, a scanner, and/or and a facsimile unit. Further, in addition to the plotter used as a part of the engine 2060, the engine 2060 further includes an image processing unit that performs image processing such as error diffusion and gamma conversion.

The controller 2010 includes, for example, a CPU 2011, a north bridge (NB) 2013, a system memory (MEM-P) 2012, a south bridge (SB) 2014, a local memory (MEM-C) 2017, an application specific integrated circuit (ASIC) 2016, and a hard disk drive (HDD) 2018, in which the north bridge (NB) 2013 and the ASIC 2016 are connected with each other by an accelerated graphics port (AGP) bus 2015. Further, the MEM-P 2012 includes, for example, a ROM 2012a, and a RAM 2012b.

The CPU 2011 controls the image forming apparatus 20 entirely. The CPU 2011 is used with, for example, a chip set having the NB 2013, the MEM-P 2012 and the SB 2014, and the CPU 2011 is connected to other devices via the chip set.

The NB 2013 is used as a bridge to connect the CPU 2011 and the MEM-P 2012, the CPU 2011 and the SB 2014, and the CPU 2011 and the AGP bus 2015. The NB 2013 includes, for example, a memory controller that controls the reading and writing data to the MEM-P 2012, a PCI master, and an AGP target.

The MEM-P 2012 is a system memory used as a memory for storing programs and data, a memory for loading programs and data, and a drawing memory for a printer. The MEM-P 2012 includes the ROM 2012a and the RAM 2012b. The ROM 2012a is a read-only memory used as a memory for storing programs and data. The RAM 2012b is a memory where programs and data can be written and read, and used as a memory for loading programs and data, and a drawing memory for a printer.

The SB 2014 is a bridge for connecting the NB 2013 to PCI devices and peripheral devices. The SB 2014 is connected to the NB 2013 via the PCI bus. The PCI bus is also connected to a network interface unit.

The ASIC 2016 is an integrated circuit (IC) having hardware elements for processing images, and the ASIC 2016 has a role of a bridge that connects the AGP bus 2015, the PCI bus, the HDD 2018, and the MEM-C 2017. The ASIC 2016 includes a PCI target and an AGP master, an arbiter (ARB) used as the core of the ASIC 2016, a memory controller for controlling the MEM-C 2017, and a plurality of direct memory access controllers (DMACs) for performing rotation of image data by a hardware logic or the like. The ASIC 2016 is connected to a fax control unit (FCU) 2030, a universal serial bus (USB) 2040, an Institute of Electrical and Electronics Engineers (IEEE) 1394 interface 2050, the engine 2060, and Bluetooth 2070 via the PCI bus. The operation/display unit 2020 is connected to the ASIC 2016 directly.

The MEM-C 2017 is a local memory used as a copy image buffer and a code buffer. The HDD 2018 is a storage for accumulating or storing image data, programs, font data, and forms or the like.

The AGP bus 2015 is a bus interface for a graphics accelerator card proposed for enhancing a graphics processing speed, and the AGP bus 2015 accesses the MEM-P 2012 directly with high throughput to enhance the processing speed of the graphics accelerator card speed. Further, in addition to these, the image forming apparatus 20 can include a hardware used for Wi-Fi (registered trademark) connection.

(Functional Configuration)

Figure 4:
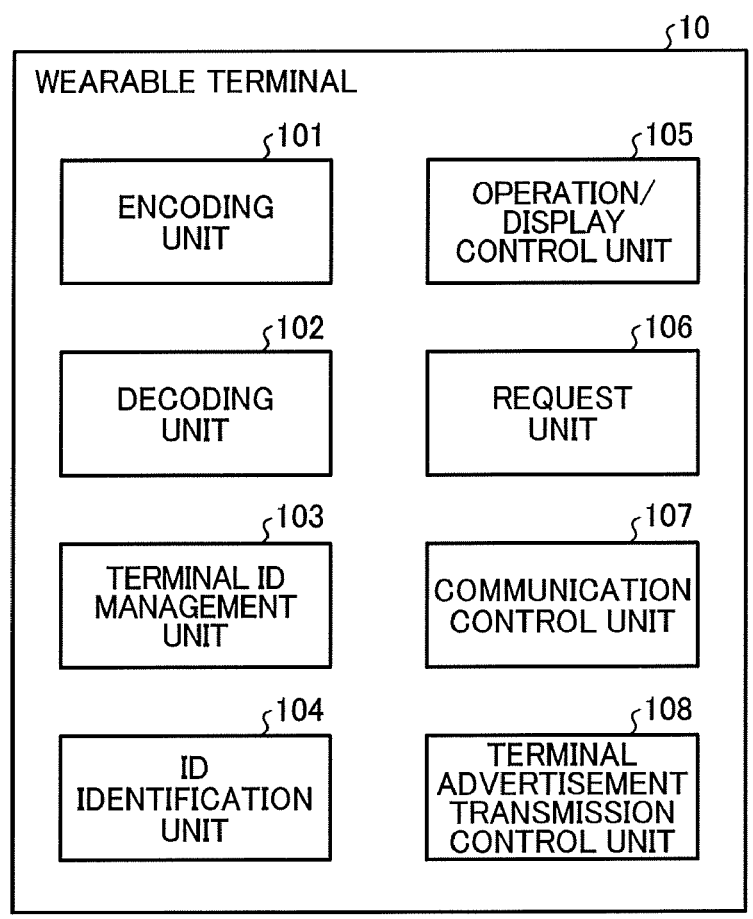
FIG. 4 is an example of a block diagram of a functional configuration of a wearable terminal of the first embodiment.

A description is given of a functional configuration of the wearable terminal 10 of the first embodiment with reference to FIG. 4. FIG. 4 is an example of a block diagram of a functional configuration of the wearable terminal 10 of the first embodiment.

As illustrated in FIG. 4, the wearable terminal 10 includes, for example, an encoding unit 101, a decoding unit 102, a terminal ID management unit 103, an ID identification unit 104, an operation/display control unit 105, a request unit 106, a communication control unit 107, and a terminal advertisement transmission control unit 108. A part or all of the above units can be implemented by one or more software programs, by a hardware circuit, or by a combination of one or more software programs and a hardware circuit.

The encoding unit 101 encodes transmission data to be transmitted by wireless communication via the communication I/F 16. For example, the encoding unit 101 encodes transmission data to be transmitted to the image forming apparatus 20 via the communication I/F 16 under the control of the communication control unit 107. The decoding unit 102 decodes the encoded data received by wireless communication using the communication I/F 16. For example, the decoding unit 102 decodes the encoded data received from the image forming apparatus 20 via the communication I/F 16 under the control of the communication control unit 107.

The terminal ID management unit 103 generates and manages the terminal ID, which is terminal identification information used for identifying the wearable terminal 10. For example, the terminal ID can use Universally Unique Identifier (UUID) as the terminal ID. When the wearable terminal 10 requests various operations to the image forming apparatus 20, the wearable terminal 10 transmits the terminal ID of the wearable terminal 10 to the image forming apparatus 20 with the request. When the wearable terminal 10 receives a new arrival notification from the image forming apparatus 20, the ID identification unit 104 determines or checks whether the received new arrival notification from the image forming apparatus 20 is an arrival notification that was received previously based on a specific ID used as identification information for identifying the new arrival notification. The specific ID is information used for identifying the new arrival notification including information indicating that an unprinted file exists, and the specific ID is generated by the image foaming apparatus 20 that transmits the new arrival notification. For example, the ID identification unit 104 saves or stores the received specific ID of the new arrival notification for a given period of time. When the wearable terminal 10 receives the new arrival notification, the ID identification unit 104 compares the specific ID of the received new arrival notification and the saved specific ID. When the specific ID of the received new arrival notification and the saved specific ID are the same, the wearable terminal 10 does not display a message that the new arrival notification is received because the new arrival notification is the arrival notification that was received previously.

The operation/display control unit 105 controls displaying of various information, and inputting of various information. For example, the operation/display control unit 105 controls display processing and input processing by the operation unit 15, in which the operation unit 15 displays a new arrival notification and unprinted file information, receives a user operation requesting an acquisition of unprinted file information and an activation of an application. The request unit 106 requests various operations to the image forming apparatus 20. For example, when the operation/display control unit 105 receives a user operation requesting an acquisition of unprinted file information and an activation of an application, the request unit 106 transmits the request to the image forming apparatus 20 via the communication I/F 16 under the control of the communication control unit 107. Further, the request unit 106 adds the terminal ID generated by the terminal ID management unit 103 in the various requests to be transmitted to the image forming apparatus 20. Further, the request unit 106 adds an application ID used for identifying an application in an activation request of the application to be transmitted to the image forming apparatus 20.

The communication control unit 107 controls various communications with an external apparatus such as the image forming apparatus 20 via the communication I/F 16. For example, the communication control unit 107 controls transmission to the image forming apparatus 20 such as an acquisition request of unprinted file information transmitted by the request unit 106, and the application activation request transmitted by the request unit 106. Further, the communication control unit 107 receives a new arrival notification transmitted by the image forming apparatus 20, and unprinted file information transmitted by the image forming apparatus 20. When the new arrival notification and the unprinted file information are transmitted from the image forming apparatus 20, the new arrival notification and the unprinted file information are transmitted to the operation/display control unit 105, and then the new arrival notification and the unprinted file information are displayed by using the operation unit 15. The terminal advertisement transmission control unit 108 controls transmission of an advertisement packet used as a broadcasted packet. For example, when the wearable terminal 10 receives the new arrival notification from the image forming apparatus 20, the terminal advertisement transmission control unit 108 transmits the advertisement packet including the terminal ID of the wearable terminal 10. In the first embodiment, the advertisement packet transmitted by the wearable terminal 10 is used to report that the wearable terminal 10 is waiting a connection with the image forming apparatus 20. The connection timing of the wearable terminal 10 between the image forming apparatus 20 by wireless communication will be described later in detail.

Figure 5:
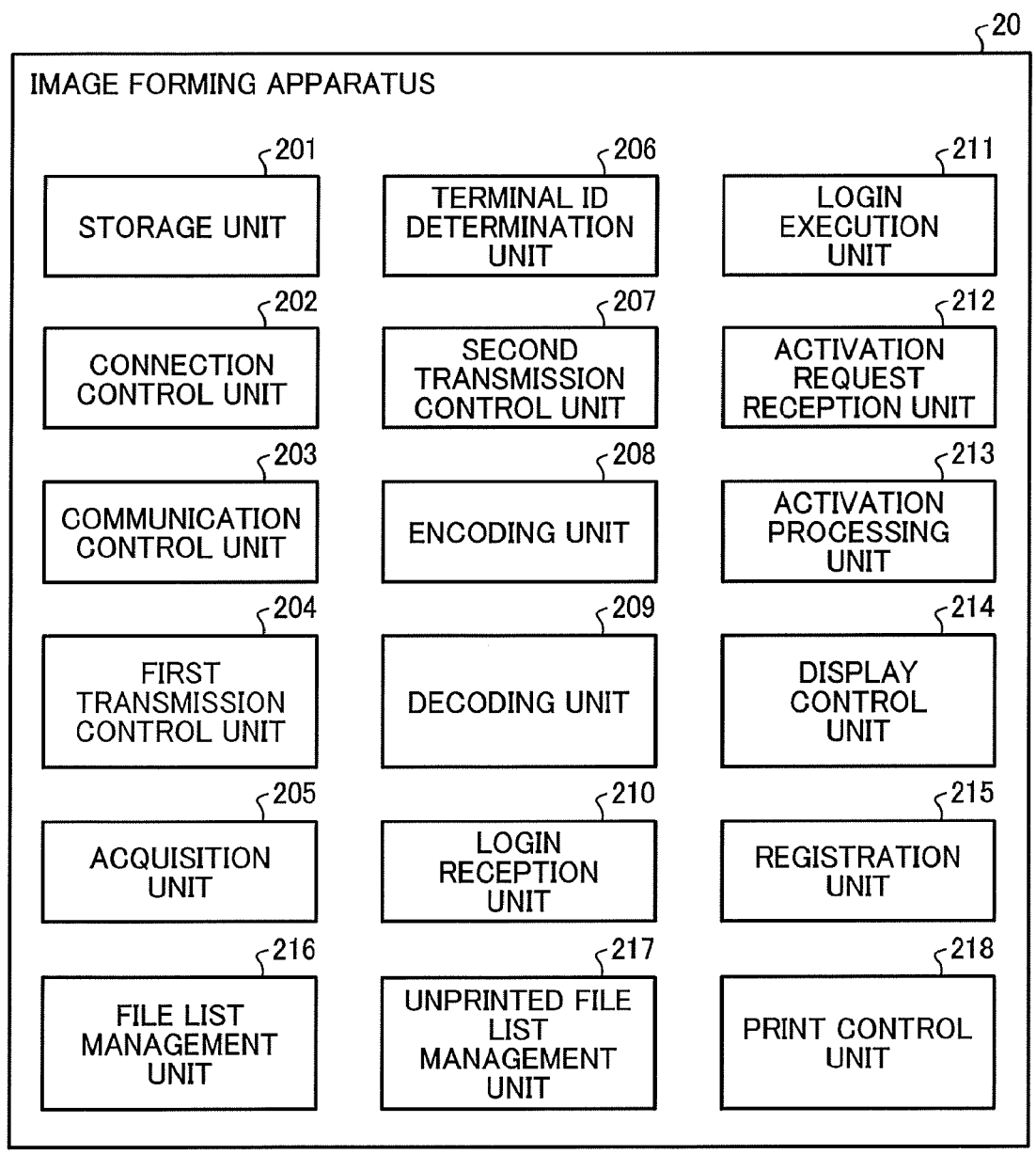
FIG. 5 is an example of a block diagram of a functional configuration of an image forming apparatus of the first embodiment.

A description is given of a functional configuration of the image forming apparatus 20 of the first embodiment with reference to FIG. 5. FIG. 5 is an example of a block diagram of a functional configuration of the image forming apparatus 20 of the first embodiment.

As illustrated in FIG. 5, the image forming apparatus 20 includes, for example, a storage unit 201, a connection control unit 202, a communication control unit 203, a first transmission control unit 204, an acquisition unit 205, and a terminal ID determination unit 206. Further, the image forming apparatus 20 includes, for example, a second transmission control unit 207, an encoding unit 208, a decoding unit 209, a login reception unit 210, a login execution unit 211, and an activation request reception unit 212. Further, the image forming apparatus 20 includes, for example, an activation processing unit 213, a display control unit 214, a registration unit 215, a file list management unit 216, an unprinted file list management unit 217, and a print control unit 218. Except the storage unit 201, a part or all of the above units may be implemented by one or more software programs, by a hardware circuit, or by a combination of one or more software programs and a hardware circuit.

The storage unit 201 stores a terminal ID, a file ID, updated date information, printed date information by linking or associating the terminal ID, the file ID, the updated date information, and the printed date information for each one of user identification information used for identifying each one of users of the wearable terminals 10. FIG. 6 is an example of information stored in the image forming apparatus 20 of the first embodiment. As illustrated in FIG. 6, the storage unit 201 stores a user name, a terminal ID, a file ID, updated date information, and printed date information for each one of the user ID used for identifying each one of users. The information stored in the storage unit 201 is registered by linking or associating the terminal ID and the ID of a file or folder that a user of the wearable terminal 10 wants to receive as the unprinted file information by using to-be-described later processing. Therefore, when one user designates or specifies a plurality of files and folders, a plurality of file IDs is registered for one user ID.

In an example case of FIG. 6, a file having a file ID "F0002" associated with a user A (user name: User A) has no printed history (i.e., no printed date), and thereby the file having the file ID "F0002" becomes a notification target of unprinted file information. Similarly, in an example case of FIG. 6, a file having a file ID "F0011" associated with a user B (user name: User B) has a updated date that is later than a printed date, and thereby the file having the file ID "F0011" becomes a notification target of unprinted file information. The printed history such as the printed date is stored as print history information.

The connection control unit 202 controls a wireless communication connection with the wearable terminal 10. For example, when the connection control unit 202 receives a connection request from the wearable terminal 10, the connection control unit 202 starts to establish a connection with the wearable terminal 10. Further, when the unprinted file information is to be reported to the wearable terminal 10, the connection control unit 202 starts to establish the connection with the wearable terminal 10. Further, after reporting the unprinted file information to the wearable terminal 10, the connection control unit 202 disconnects or terminates a connection with the wearable terminal 10. Further, when a given time period elapses after establishing the connection with the wearable terminal 10, in which the time is counted after the connection control unit 202 is connected to the wearable terminal 10, without communicating data between the connection control unit 202 and the wearable terminal 10, the connection control unit 202 disconnects the connection with the wearable terminal 10. Therefore, when any kind of operation is not performed at the connected wearable terminal 10 for the given time period or more, the connection control unit 202 disconnects the connection with the wearable terminal 10. Further, when the connection control unit 202 receives a login request from the wearable terminal 10 that has received the unprinted file information, the connection control unit 202 starts to establish the connection with the wearable terminal 10. Further, when the wearable terminal 10 transmits an activation request of an application, and then the image forming apparatus 20 performs the application activation processing, the connection control unit 202 disconnects the connection with the wearable terminal 10. Further, the connection control processing by the connection control unit 202 will be described later.

The communication control unit 203 controls various communications with an external apparatus such as the wearable terminal 10 and the file server 30. For example, the communication control unit 203 receives the unprinted file information request including a terminal ID transmitted by the wearable terminal 10, receives a login request including a terminal ID transmitted by the wearable terminal 10, and receives the application activation request including a terminal ID transmitted by the wearable terminal 10. Further, the communication control unit 203 transmits the unprinted file information to the wearable terminal 10.

The first transmission control unit 204 controls transmission of the advertisement packet used as a broadcasted packet. For example, the first transmission control unit 204 transmits the advertisement packet (new arrival notification) including information indicating that the unprinted file exists in the files managed by the file server 30 based on the unprinted file list. The advertisement packet (new arrival notification) includes file information of one or more files that can be printed by the image forming apparatus 20. The unprinted file list can be generated and stored as follows. Specifically, the file list management unit 216 periodically accesses the file server 30 via the communication control unit 203, and generates and maintains a file list including information of file IDs used for identifying each of the files, file names of each of the files, and updated date information of each of the files managed by the file server 30. In this configuration, the image forming apparatus 20 can acquire printed date information for a file printed by the image forming apparatus 20. As to the files included in the file list generated and stored by the file list management unit 216, the unprinted file list management unit 217 generates and maintains one or more files having an updated date later than printed date, and one more files having no printed history (i.e., no printed date information) as the unprinted file list. In this configuration, the first transmission control unit 204 determines whether an unprinted file exists based on the unprinted file list, and when the unprinted file exists, the first transmission control unit 204 transmits the new arrival notification to the wearable terminal 10.

Further, the first transmission control unit 204 adds a specific ID used for identifying the new arrival notification to the above described new arrival notification. When the wearable terminal 10 receives the new arrival notification having the specific ID, the wearable terminal 10 can identify whether the new arrival notification was already received previously. Further, when a file that is not printed for a given time period or more exists in the files managed by the file server 30 (i.e., unprinted file exists for a given time period or more), the first transmission control unit 204 transmits the new arrival notification including information indicating that the file not printed for the given time period or more exists. With this configuration, the wearable terminal 10 can display a message indicating that the file not printed for the given time period or more exists.

After the new arrival notification is transmitted to the wearable terminal 10, the acquisition unit 205 acquires a terminal ID of the wearable terminal 10 from the wearable terminal 10. For example, after the new arrival notification is transmitted to the wearable terminal 10, the acquisition unit 205 acquires the terminal 1D included in the acquisition request of unprinted file information received from the wearable terminal 10 that has received the new arrival notification. In this configuration, after receiving the acquisition request of unprinted file information from the wearable terminal 10, the connection control unit 202 starts to establish the connection with the wearable terminal 10 based on a connection request received from the wearable terminal 10 that has received the new arrival notification. With this configuration, after establishing the connection with the wearable terminal 10, the acquisition unit 205 acquires the terminal ID included in the acquisition request of unprinted file information transmitted from the wearable terminal 10.

In this configuration, the connection with the wearable terminal 10 is started when the wearable terminal 10 receives the new arrival notification, and then the wearable terminal 10 transmits a connection request to the image forming apparatus 20, but the trigger of starting the connection with the wearable terminal 10 is not limited thereto. For example, when the image forming apparatus 20 receives a connection waiting report transmitted from the wearable terminal 10, the image forming apparatus 20 can start to establish the connection with the wearable terminal 10 when the image forming apparatus 20 is to report the unprinted file information to the wearable terminal 10. In this configuration, the acquisition unit 205 acquires the terminal ID included in the connection waiting report indicating that the wearable terminal 10 is waiting the connection with the mage forming apparatus 20.

The terminal ID determination unit 206 determines whether the terminal ID is stored in the storage unit 201 For example, the terminal ID determination unit 206 determines whether the terminal ID acquired by the acquisition unit 205 is stored in the storage unit 201. If the terminal ID acquired by the acquisition unit 205 is stored in the storage unit 201, the terminal ID determination unit 206 reports that the terminal ID acquired by the acquisition unit 205 is stored in the storage unit 201 to the second transmission control unit 207. Further, after the image forming apparatus 20 is being connected to the wearable terminal 10, and it is determined that the terminal ID acquired by the acquisition unit 205 is not stored in the storage unit 201, the terminal ID determination unit 206 reports that the terminal ID acquired by the acquisition unit 205 is not stored in the storage unit 201 to the connection control unit 202, and then the connection control unit 202 disconnects the connection with the wearable terminal 10. Specifically, when the wearable terminal 10 receives the new arrival notification, and then wearable terminal 10 transmits a connection request to the image forming apparatus 20, the image forming apparatus 20 acquires the terminal ID included in the acquisition request of unprinted file information, but if the terminal ID is not stored in the storage unit 201, the connection control unit 202 disconnects the connection with the wearable terminal 10. Further, when the acquisition unit 205 acquires the terminal ID from the wearable terminal 10 before starting the connection with the wearable terminal 10, but the terminal ID acquired by the acquisition unit 205 is not stored in the storage unit 201, the terminal ID determination unit 206 ends the processing. Specifically, when the image forming apparatus 20 acquires the terminal ID included in the connection waiting report from the wearable terminal 10 that has received the new arrival notification, but the terminal ID acquired from the wearable terminal 10the is not stored in the storage unit 201, the terminal ID determination unit 206 ends the processing. In this configuration, the terminal ID determination unit 206 determines whether the terminal ID (terminal identification information) acquired from the user terminal matches the terminal ID (terminal identification information) stored in the storage unit 201.

The second transmission control unit 207 transmits the unprinted file information to the wearable terminal 10. For example, when the terminal ID determination unit 206 determines that the acquired terminal ID is stored in the storage unit 201, the second transmission control unit 207 extracts a file ID of at least one unprinted file based on the updated date information and printed date information linked or associated with the terminal ID. Then, the second transmission control unit 207 transmits the unprinted file information including file name information indicating a file name of a file linked or associated with the extracted file ID to the wearable terminal 10 The unprinted file information can be transmitted via the communication control unit 203. The file name of the file linked or associated with the extracted file ID can be identified based on the file list or the unprinted file list. Further, after the second transmission control unit 207 transmits the unprinted file information to the wearable terminal 10, the connection control unit 202 disconnects the connection with the wearable terminal 10.

The encoding unit 208 encodes transmission data to be transmitted by using wireless communication. For example, the encoding unit 208 encodes transmission data to be transmitted to the wearable terminal 10 under the control of the communication control unit 203 after establishing the connection with the wearable terminal 10 under the control of the connection control unit 202. The decoding unit 209 decodes the encoded data received by wireless communication. For example, after establishing the connection with the wearable terminal 10 under the control of the connection control unit 202, the decoding unit 209 decodes the encoded data received from the wearable terminal 10 under the control of the communication control unit 203.

The login reception unit 210 receives a login request from the wearable terminal 10. For example, after the wearable terminal 10 receives the unprinted file information, the login reception unit 210 receives a login request including the terminal ID of the wearable terminal 10 from the wearable terminal 10. The wearable terminal 10 performs the login request to the image forming apparatus 20 to perform, for example, an activation request of a print application to be described later. In this configuration, when the login reception unit 210 receives the login request from the wearable terminal 10 that has received the unprinted file information, the connection control unit 202 starts to establish the connection with the wearable terminal 10. The login execution unit 211 performs a login processing. For example, when the terminal ID included in the login request, received by the login reception unit 210, is stored in the storage unit 201, the login execution unit 211 performs the login processing based on a user ID and/or a user name linked or associated with the terminal ID.

The activation request reception unit 212 receives an activation request of the application from the wearable terminal 10. For example, after the login execution unit 211 performs the login processing, the activation request reception unit 212 receives an application activation request including an application ID used for identifying an application from the wearable terminal 10. The application ID is information used for identifying the application to be activated by the image forming apparatus 20. For example, when a print application is activated, the application ID identifies the print application.

The activation processing unit 213 performs an activation processing of the application linked or associated with the application ID. For example, when the activation request reception unit 212 receives the application activation request, the activation processing unit 213 performs an activation processing of the application (e.g., print application) identified by the application ID included in the application activation request. In this configuration, when the application identified by the application ID is activated, the connection control unit 202 disconnects or terminates a connection with the wearable terminal 10.

The display control unit 214 controls displaying of various information and inputting of various information. For example, the display control unit 214 controls the display processing and input processing by the operation/display unit 2020, in which the operation/display unit 2020 displays a connection screen and a login screen to the file server 30, a registration screen used for associating a terminal ID and a file ID with each other, a selection screen used for selecting a file and/or folder from the unprinted file information that a user wants to receive, and a print screen linked or associated with a print application activation. Further, the display control unit 214 receives an input of various information corresponding to a user operation on each of the various screens. For example, when the print screen is displayed and then a print execution is selected on the print screen, the print control unit 218 controls printing process. Each of the screens will be described later in detail. The operation/display unit 2020 can be also referred to as the operation unit, and the display/operation unit.

The registration unit 215 registers a user ID, a terminal ID, a file ID of a file that a user wants to receive as the unprinted file information, the updated date information of the concerned file, and the printed date information of the concerned file in the storage unit 201 by associating these information with each other. As above described, the information stored in the storage unit 201 includes information registering the terminal ID of the wearable terminal 10 used by a user, and a file ID of a file that the user of the wearable terminal 10 wants to receive as the unprinted file information by associating the terminal ID of the wearable terminal 10 and the file ID with each other. Hereinafter, a description is given of a registration processing.

For example, the first transmission control unit 204 transmits the advertisement packet to the wearable terminal 10 to receive a registration request of the terminal ID from the wearable terminal 10. When the wearable terminal 10 receives the advertisement packet from the image forming apparatus 20, the wearable terminal 10 displays a screen used for selecting whether the wearable terminal 10 is to be connected to the image forming apparatus 20 that has transmitted the advertisement packet to the wearable terminal 10. In this configuration, it is assumed that a user performs a selection operation for connecting the wearable terminal 10 to the image forming apparatus 20. In this configuration, when the user selects a connection of the wearable terminal 10 to the image forming apparatus 20, the wearable terminal 10 transmits the registration request including the terminal ID to the image forming apparatus 20.

When the image forming apparatus 20 receives the registration request including the terminal ID from the wearable terminal 10, the display control unit 214 displays a screen used for inputting a user ID and a password. In this configuration, a user verification is performed based on information such as the user ID and the password. Further, when the user verification succeeds, the user ID and the terminal ID can be associated with each other. Further, the display control unit 214 displays a screen for selecting one or more files that the user wants to receive as the unprinted file information. In this configuration, it is assumed that the user performs an operation of selecting one or more files and/or folders displayed as the unprinted file information that the user wants to receive. With these processing, the user ID, the terminal ID, and the file ID can be associated with each other, and the updated date information and printed date information associated with the file ID can be associated with the user ID and the terminal ID. In this configuration, after the user verification based on the user ID succeeds, the registration unit 215 registers the user ID, the terminal ID included in the registration request, the file ID of the selected file, the updated date information of the selected file, and the printed date information of the selected file in the storage unit 201 by associating these information with each other.

As above described, the information registered in the storage unit 201 includes the information related to one or more files that the user wants to receive as the unprinted file information. Therefore, the storage unit 201 may not register information of all files included in the above described file list and unprinted file list except when the user (each user) performs the operation of receiving information of all files as the unprinted file information.

(Screens)

A description is given of each of various screens of the first embodiment with reference to FIGS. 7 to 12.

FIG. 7 is an example of a screen used for inputting an address of the file server 30 of the first embodiment. An input screen of FIG. 7 is displayed by using the operation/display unit 2020 of the image forming apparatus 20. As illustrated in FIG. 7, when an address of the file server 30 (e.g., name of computer, internet protocol (IP) address) is input on the input screen, it is checked whether the image forming apparatus 20 can be connected to the file server 30. In this configuration, if the image forming apparatus 20 cannot be connected to the file server 30, an error message indicating that the image forming apparatus 20 cannot be connected to the file server 30 is displayed.

FIG. 8 is an example of a login screen to the file server 30 of the first embodiment. After the address of the file server 30 is input, the operation/display unit 2020 of the image forming apparatus 20 displays a login screen used for inputting a login ID and a login password to log in and access the file server 30 from the image forming apparatus 20 as illustrated in FIG. 8. In this case, it is assumed that a common or shared account is set for the file server 30, and folders and files stored in the file server 30 can be accessed from the common or shared account. The image forming apparatus 20 periodically accesses the file server 30 by using the common or shared account to acquire a file list. When the login ID and the login password are input, the image forming apparatus 20 determines or checks whether the image forming apparatus 20 can log in the file server 30. When the login succeeds, the image forming apparatus 20 transmits a radio wave so that the wearable terminal 10 can detect the image forming apparatus 20. When BLE (registered trademark) is used, the image forming apparatus 20 outputs the advertisement packet. By contrast, when the login to the file server 30 fails, an error message indicating that the image forming apparatus 20 cannot login the file server 30 is displayed.

Figure 9:
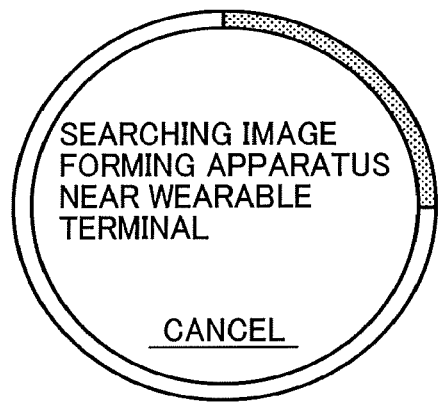
FIG. 9 is an example of a search screen indicating that searching of an image forming apparatus by a wearable terminal is being performed in the first embodiment.

FIG. 9 is an example of a search screen indicating that searching of the image forming apparatus 20 by the wearable terminal 10 is being performed. At given timing after the advertisement packet described with reference to FIG. 8 is output, a user operates the wearable terminal 10 to instruct searching of the image forming apparatus 20. As illustrated in FIG. 9, when the wearable terminal 10 is waiting to receive the advertisement packet, the operation unit 15 of the wearable terminal 10 displays a screen with a message indicating that the image forming apparatus 20 near the wearable terminal 10 is being searched.

Figure 10:
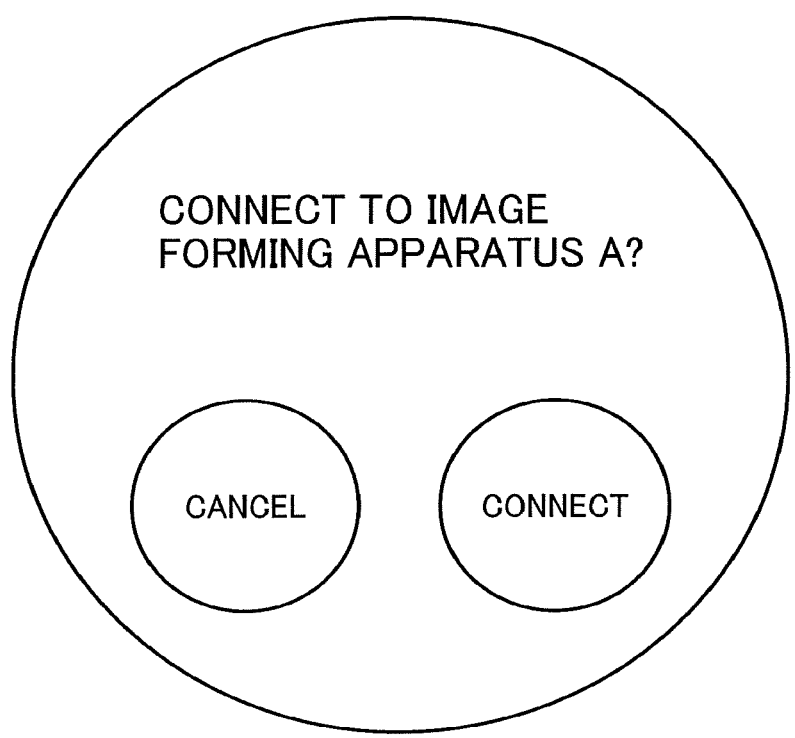
FIG. 10 is an example of a connection screen when a wearable terminal is to be connected to an image forming apparatus in the first embodiment.

FIG. 10 is an example of a connection screen when the wearable terminal 10 is to be connected to the image forming apparatus 20 of the first embodiment. When the image forming apparatus 20 is detected by the searching described with reference to FIG. 9, the wearable terminal 10 displays a screen used for selecting whether the wearable terminal 10 is to be connected to the image forming apparatus 20 as illustrated in FIG. 10. In an example case of FIG. 10, the image forming apparatus 20 having a name of an image forming apparatus A such as a multi-functional apparatus is displayed as a search result. When a user wants to connect the wearable terminal 10 to the image forming apparatus A, the user taps a "connect" button. With this processing, the wearable terminal 10 is connected to the image forming apparatus 20 (e.g. image forming apparatus A) by using wireless communication, and transmits the terminal ID of the wearable terminal 10 to the image forming apparatus 20 (e.g. image forming apparatus A). Further, when a plurality of the image forming apparatuses 20 is disposed near the wearable terminal 10, and each of the image forming apparatuses 20 is transmitting the advertisement packet using BLE (registered trademark), and the user taps a "cancel" button on the connection screen of FIG. 10, the wearable terminal 10 displays a screen used for selecting whether the wearable terminal 10 is to be connected to another detected image forming apparatus 20 having another name such as an image forming apparatus B.

Figure 11:
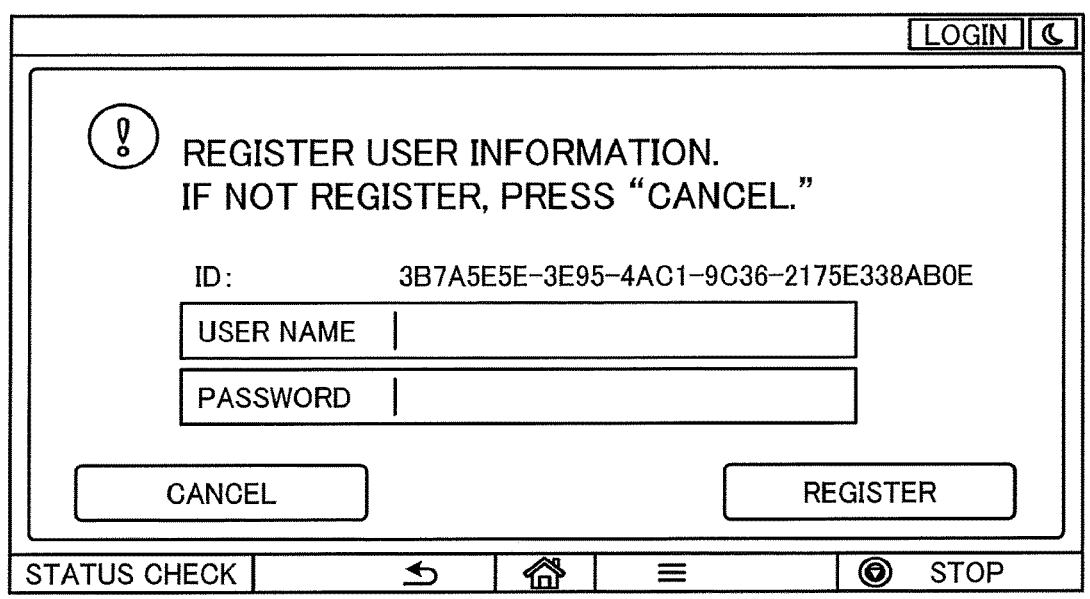
FIG. 11 is an example of a registration screen of a terminal ID of the first embodiment.

FIG. 11 is an example of a registration screen of a terminal ID of the first embodiment. When the wearable terminal 10 is connected to the image forming apparatus 20, and the wearable terminal 10 transmits the terminal ID to the image forming apparatus 20 as described with reference to FIG. 10, the image forming apparatus 20 displays the received terminal ID, and displays a screen used for inputting a user ID and a password. The user ID and the password input at this stage are used as information that can login to the image forming apparatus 20, in which the user ID and the password used for accessing the file server 30 can be used. When the user ID and the password are input on the registration screen, the user ID and the terminal ID are associated with each other.

Figure 12:
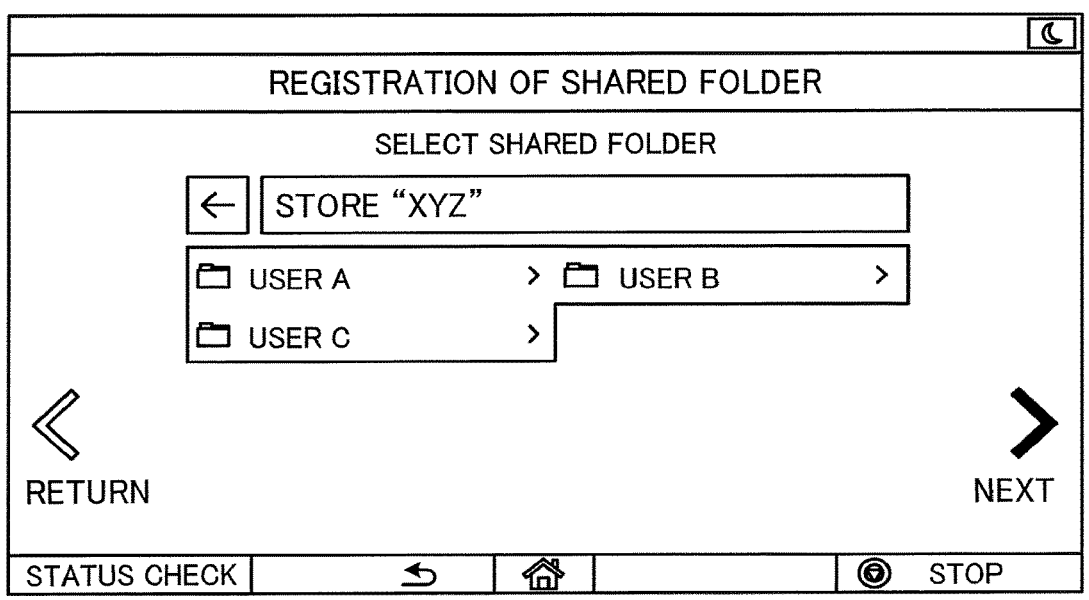
FIG. 12 is an example of a selection screen used for selecting a file from unprinted file information used as a reporting target of the first embodiment.

FIG. 12 is an example of a selection screen used for selecting a file from the unprinted file information used as a reporting target of the first embodiment. When the user can login the file server 30 by using the user ID and the password input to the screen of FIG. 11, the image forming apparatus 20 displays a list screen of folders that the user can use as illustrated in FIG. 12. The user of the wearable terminal 10 performs a selection operation for the folder on the list screen so that the wearable terminal 10 can receive a folder or file that the user wants to receive at the wearable terminal 10 as the unprinted file information. With this configuration, the above described user ID and the terminal ID can be associated with the file ID, the updated date information, and the printed date information each other, and then registered in the storage unit 201.

(Transmission of New Arrival Notification)

Figure 13:
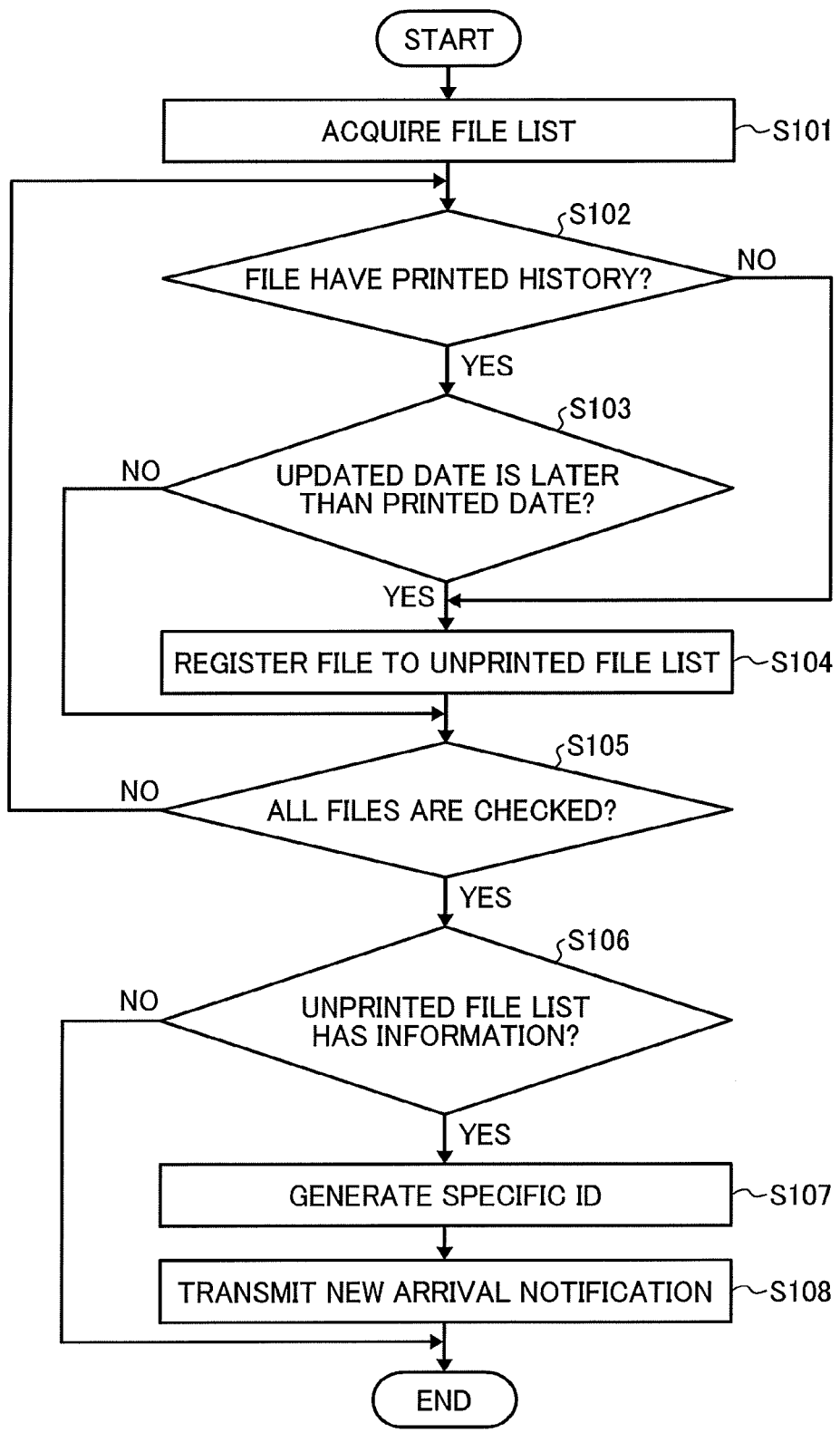
FIG. 13 is an example of a flow chart illustrating the steps of a new arrival notification transmission processing of the first embodiment.

A description is given of a flow of new arrival notification transmission processing of the first embodiment with reference to FIG.13. FIG.13 is an example of a flow chart illustrating the steps of the new arrival notification transmission processing of the first embodiment.

As illustrated in FIG. 13, the image forming apparatus 20 accesses the file server 30, and acquires a file list including information such as file IDs used for identifying the files managed by the file server 30, file names of the files, and updated date of the files (step S101). The image forming apparatus 20 can be configured to acquire the file list periodically. Then, the image forming apparatus 20 determines whether a file included in the file list has a printed history based on the acquired file list, and the printed date information of the file printed by the image forming apparatus 20 (step S102). When the file included in the file list has the printed history (step S102: YES), the image forming apparatus 20 determines whether the updated date is later than the printed date for the printed file (step S103). By contrast, when the file included in the file list does not have the printed history (step S102: NO), the image forming apparatus 20 proceeds the sequence to step S104 because the concerned file is not yet printed.

Further, when the updated date is later than the printed date for the printed file (S103: YES), the image forming apparatus 20 registers the concerned file to the unprinted file list (step S104) because the concerned file is a unprinted file, which means the concerned file is not printed after updating the concerned file. Further, the unprinted file list is registered with one or more files included in the file list, not having the printed history, similarly. By contrast, when the updated date is older or earlier than the printed date for the printed file (step S103: NO), the image forming apparatus 20 proceeds the sequence to step S105. Specifically, at step S105, the image forming apparatus 20 confirms whether processing of steps S102 to S104 is performed for all of the files included in the file list to check the status of the files. If a file not processed by steps S102 to S104 still exists (step S105: NO), the image forming apparatus 20 returns the sequence to step S102, and if it is confirmed that all of the files included in the file list is processed by steps S102 to S104 (step S105: YES), the image forming apparatus 20 proceeds the sequence to step S106.

Further, the image forming apparatus 20 determines whether the unprinted file list has information (step S106). When the unprinted file list has information (step S106: YES), the image forming apparatus 20 generates a specific ID used for identifying a new arrival notification (step S107), and transmits the new arrival notification including the generated specific ID (step S108). By contrast, when the unprinted file list has no information (step S106: NO), the image forming apparatus 20 ends the sequence without transmitting the new arrival notification because the unprinted file does not exist.

Figure 14:
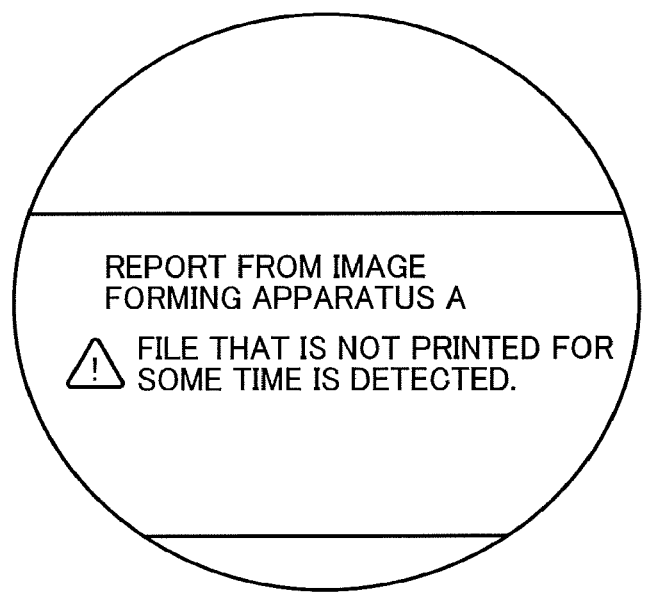
FIG. 14 is an example of a new arrival notification screen of the first embodiment.

Further, as above described, when a file that is not printed for a given time period or more exists when transmitting the new arrival notification, the new arrival notification including information indicating that the file that is not printed for the given time period or more exists can be transmitted. FIG. 14 is an example of the new arrival notification screen of the first embodiment. For example, when the wearable terminal 10 receives the new arrival notification including information indicating that the unprinted file exists for the given time period or more, the wearable terminal 10 displays a message indicating that the unprinted file exists for the given time period or more on the new arrival notification screen as illustrated in FIG.14.

(Reporting of Unprinted File Information)

Figure 15:
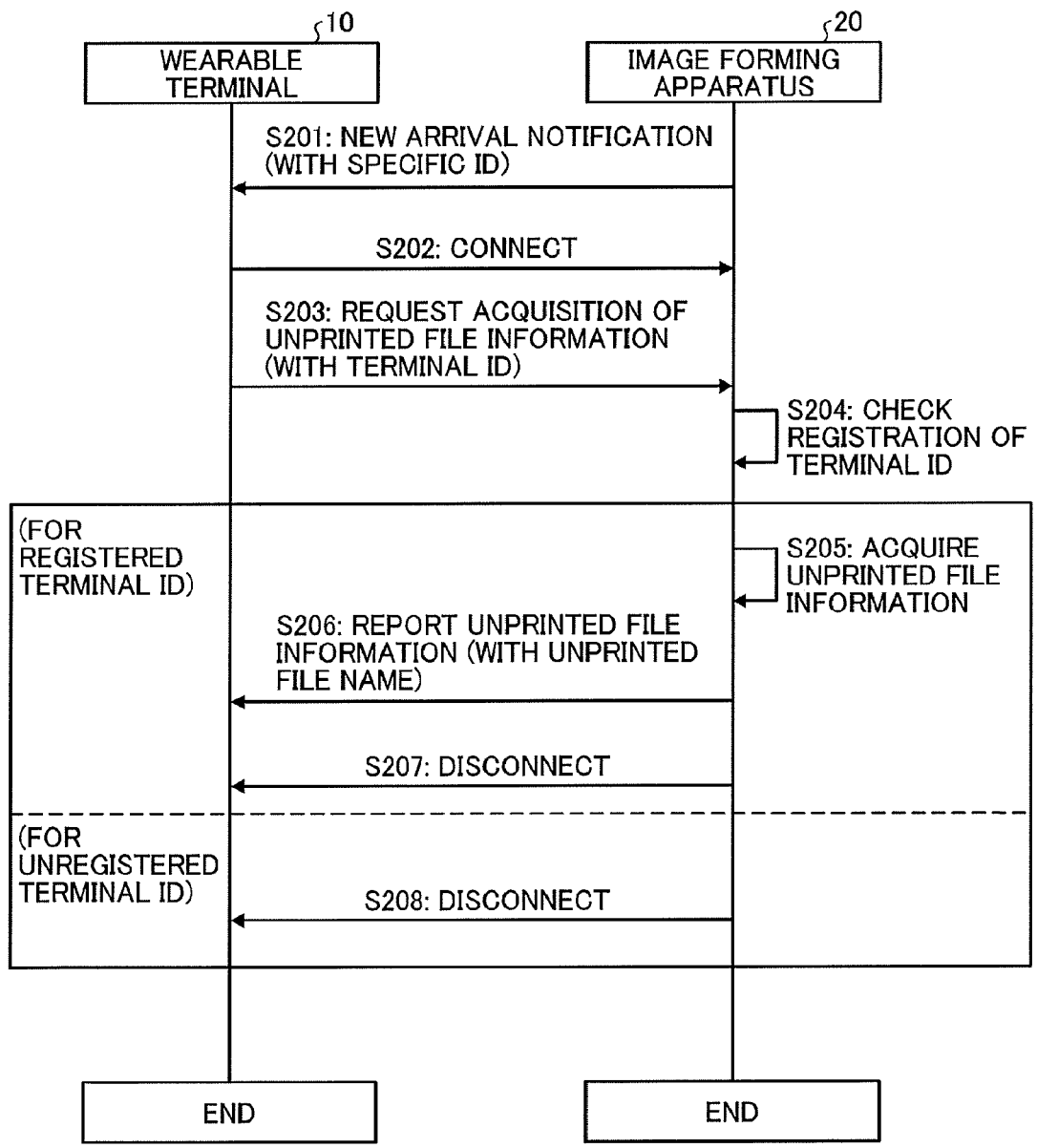
FIG. 15 is an example of a sequential chart illustrating a flow of reporting unprinted file information in the first embodiment.

A description is given of a flow of reporting the unprinted file information of the first embodiment with reference to FIG. 15. FIG. 15 is an example of a sequential chart illustrating a flow of reporting the unprinted file information of the first embodiment. In an example case of FIG. 15, when the wearable terminal 10 receives a new arrival notification from the image forming apparatus 20, the wearable terminal 10 establishes the connection with the image forming apparatus 20, and then the wearable terminal 10 transmits an acquisition request of unprinted file information.

As illustrated in FIG. 15, the image forming apparatus 20 transmits a new arrival notification including a specific ID (step S201). When the wearable terminal 10 receives the new arrival notification, the wearable terminal 10 establishes the connection with the image forming apparatus 20 (step S202), and the wearable terminal 10 requests an acquisition of unprinted file information including a terminal ID to the connected image forming apparatus 20 (step S203). When the image forming apparatus 20 receives the acquisition request of the unprinted file information including the terminal ID from the wearable terminal 10, the image forming apparatus 20 determines whether the terminal ID is stored in the storage unit 201 (step S204).

When the terminal ID is stored or registered in the storage unit 201, the image forming apparatus 20 extracts a file ID of a unprinted file based on the printed date information and updated date information associated with the terminal ID, and acquires the file name information indicating a file name associated with the extracted file ID (step S205). Then, the image forming apparatus 20 reports unprinted file information including the file name information of the unprinted file to the wearable terminal 10 (step S206). After reporting the unprinted file information, the image forming apparatus 20 disconnects or terminates the connection with the wearable terminal 10 (step S207). By contrast, when the terminal ID is not stored or registered in the storage unit 201, the image forming apparatus 20 disconnects or terminates the connection with the wearable terminal 10 because the unprinted file information that can be reported to the wearable terminal 10 does not exist (step S208).

Figure 16:
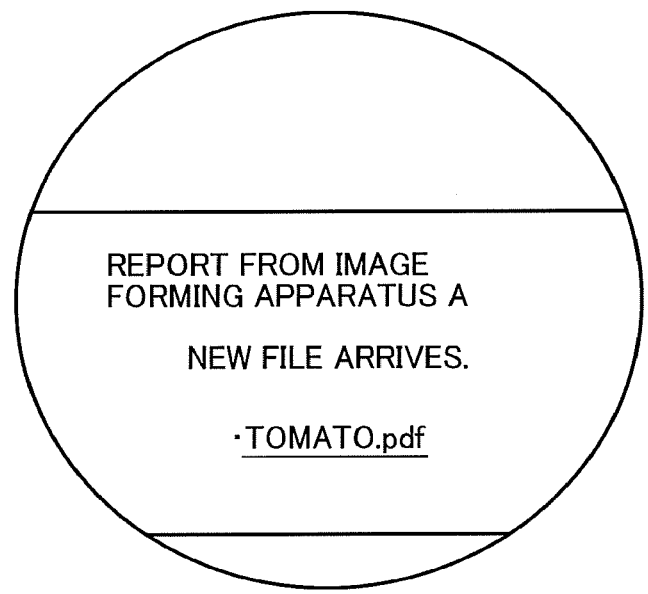
FIG. 16 is an example of an unprinted file information screen of the first embodiment.

FIG. 16 is an example of an unprinted file information screen of the first embodiment. For example, when the wearable terminal 10 receives the unprinted file information including the file name information, the wearable terminal 10 displays a message indicating that the unprinted file exists, and a file name of the unprinted file as illustrated in FIG. 16.

Figure 17:
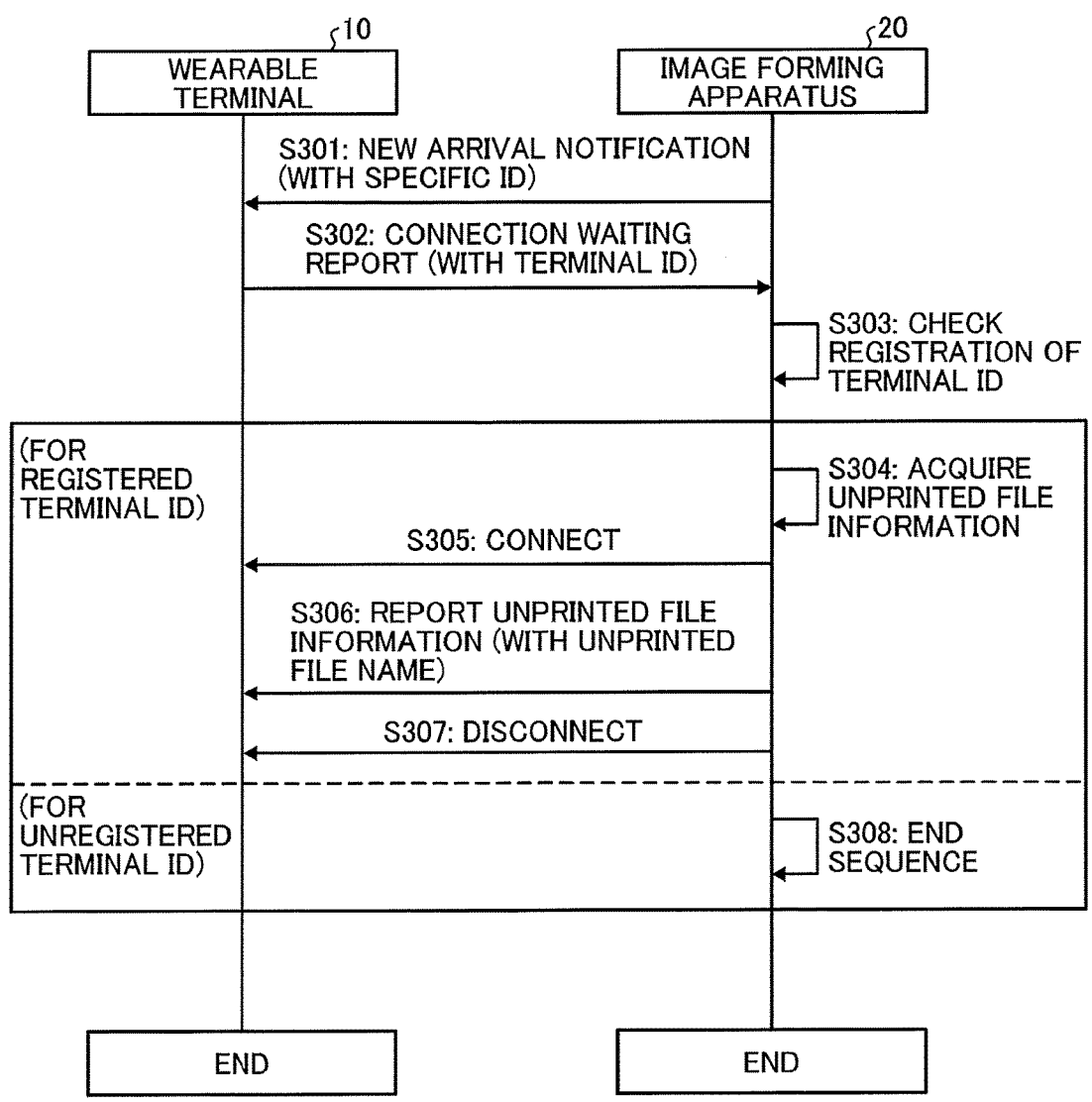
FIG. 17 is another example of a sequential chart illustrating a flow of reporting unprinted file information in the first embodiment.

A description is given of another flow of reporting the unprinted file information of the first embodiment with reference to FIG. 17. FIG. 17 is another example of a sequential chart illustrating a flow of reporting unprinted file information of the first embodiment. In an example case of FIG. 17, when the wearable terminal 10 that has received the new arrival notification transmits the connection waiting report, the image forming apparatus 20 establishes the connection with the wearable terminal 10 when the image forming apparatus 20 is to report the unprinted file information to the wearable terminal 10.

As illustrated in FIG. 17, the image forming apparatus 20 transmits a new arrival notification including a specific ID to the wearable terminal 10 (step S301). When the wearable terminal 10 receives the new arrival notification, the wearable terminal 10 transmits a connection waiting report including a terminal ID to the image forming apparatus 20 (step S302). When the image forming apparatus 20 receives the connection waiting report including the terminal ID, the image forming apparatus 20 determines whether the terminal ID is stored in the storage unit 201 (step S303).

When the terminal ID is stored in the storage unit 201, the image forming apparatus 20 extracts a file ID of a unprinted file based on the printed date information and updated date information associated with the terminal ID, and acquires file name information indicating a file name associated with the extracted file ID (step S304) Then, the image forming apparatus 20 establishes the connection with the wearable terminal 10 (step S305), and the image forming apparatus 20 reports unprinted file information including the file name information of the unprinted file to the wearable terminal 10 (step S306).

After reporting the unprinted file information, the image forming apparatus 20 disconnects or terminates the connection with the wearable terminal 10 (step S307). By contrast, when the terminal ID is not stored in the storage unit 201, the image forming apparatus 20 ends the sequence because the unprinted file information that can be reported to the wearable terminal 10 does not exist (step S308). When it is determined that the terminal ID is not stored in the storage unit 201, a wireless communication connection between the wearable terminal 10 and the image forming apparatus 20 is not started, in which the sequence ends without performing the disconnection.

(Activation of Application)

Figure 18:
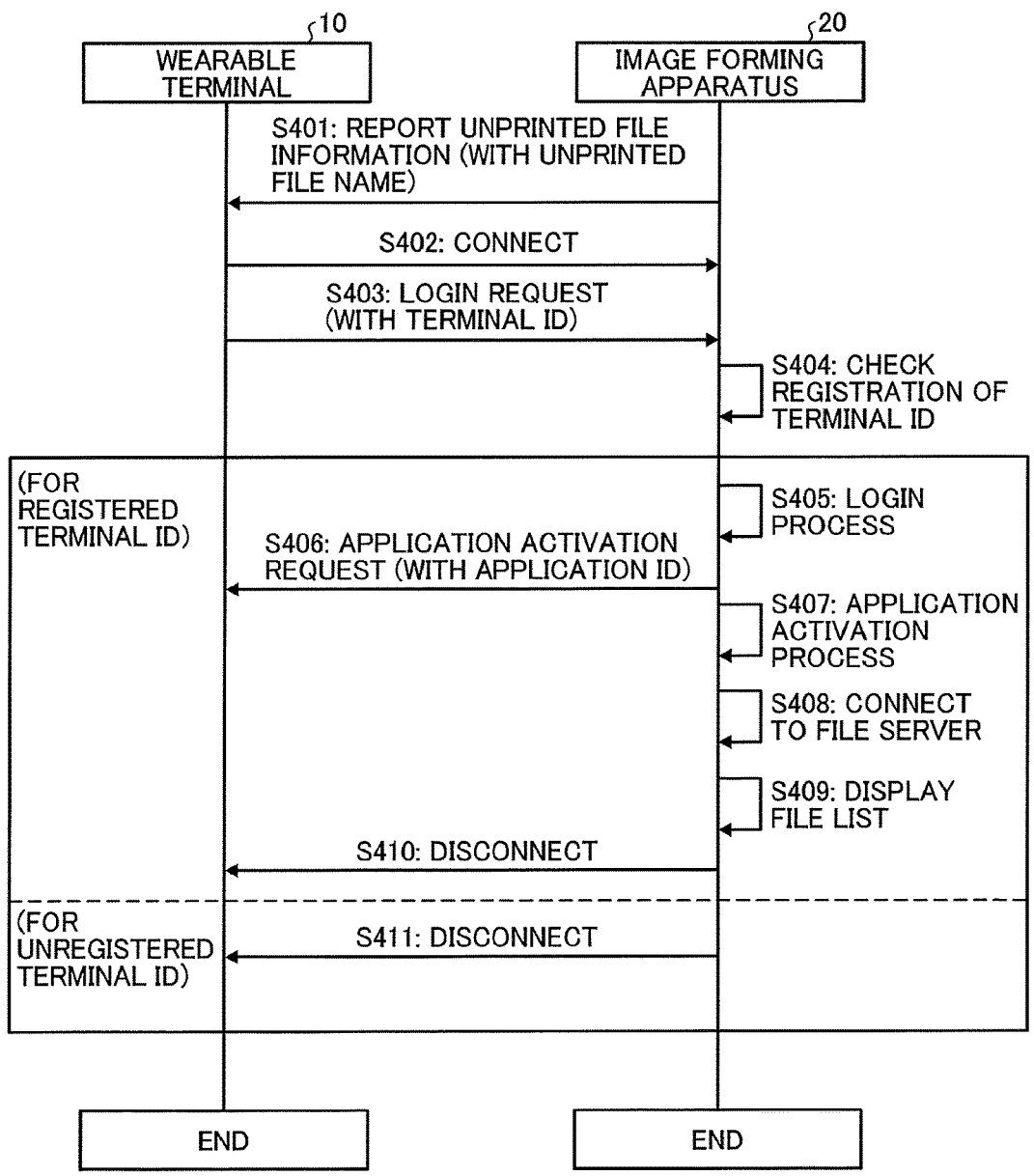
FIG. 18 is an example of a sequential chart illustrating a flow of activation of an application in the first embodiment.

A description is given of a flow of activation of an application of the first embodiment with reference to FIG. 18. FIG. 18 is an example of a sequential chart illustrating a flow of activation of an application of the first embodiment. In an example case of FIG. 18, an activation of a print application is described as one example of activation of the application.

As illustrated in FIG. 18, the image forming apparatus 20 reports the unprinted file information including the file name information of the unprinted file to the wearable terminal 10 (step S401). As above described, after reporting the unprinted file information, the image forming apparatus 20 disconnects or terminates a connection with the wearable terminal 10. When the wearable terminal 10 receives the unprinted file information, the wearable terminal 10 displays the unprinted file information screen illustrated in FIG. 16. In this case, it is assumed that a user selects any one of file information displayed on the unprinted file information screen. With this processing, the wearable terminal 10 establishes the connection with the image forming apparatus 20 (step S402), and transmits a login request including a terminal ID to the connected image forming apparatus 20 (step S403). When the image forming apparatus 20 receives the login request including the terminal ID, the image forming apparatus 20 determines whether the terminal ID is stored in the storage unit 201 (step S404).

When the terminal ID is stored in the storage unit 201, the image forming apparatus 20 performs the login processing by using a user ID associated with the terminal ID (step S405). Further, the wearable terminal 10 transmits an application activation request including an application ID that the image forming apparatus 20 can recognize to the image forming apparatus 20 (step S406). When the image forming apparatus 20 receives the application activation request including the application ID, the image fanning apparatus 20 performs an activation processing of an application (e.g., print application) associated with the application ID (step S407). Then, the image forming apparatus 20 establishes the connection with the file server 30 (step S408), and generates thumbnail images of files, and displays a file list including the thumbnail images of files (step S409). Further, after activating the application, the image forming apparatus 20 disconnects the connection with the wearable terminal 10 (step S410). By contrast, when the terminal ID is not stored in the storage unit 201, the image forming apparatus 20 disconnects or terminates the connection with the wearable terminal 10 because the login cannot be performed (step S411).

FIGS. 19A and 19B illustrate examples of a file list screen of the first embodiment. Specifically, FIG. 19 is an example of a file list screen that is displayed when an application activation request including an application ID of a print application is performed. As illustrated in FIGS. 19A and 19B, the file list screen displays, for example, a plurality of thumbnails of files as selectable print targets, and a plurality of objects used for setting printing conditions. Further, when an unprinted file exists, an "unprinted" mark indicating that the file is not printed can be displayed for thumbnails of the folders and files as illustrated in FIGS. 19A and 19B. A user selects a file to be printed as a print target, and taps a print button. With this processing, the image forming apparatus 20 performs printing of the selected file. When the file is printed, the printed date information associated with the concerned file is updated. For example, when the unprinted file is printed, printed date information associated with the concerned file is updated and registered with the latest printed date.

(Effect of First Embodiment)

The image forming apparatus 20 stores the terminal ID used for identifying the wearable terminal 10 that the user owns or uses, the file ID of the file that the user wants to be reported as the unprinted file information, the updated date information of the concerned file, and printed date information of the concerned file in the storage unit 201 by linking or associating these information. Then, when an unprinted file exists in the files managed by the file server 30, the image forming apparatus 20 transmits a new arrival notification indicating that that the unprinted file exists to the wearable terminal 10, and acquires the terminal ID from the wearable terminal 10 as a response of the new arrival notification transmission. Then, when the acquired terminal ID is stored in the storage unit 201, the image forming apparatus 20 extracts the file ID of the unprinted file based on the updated date information and printed date information linked or associated with the terminal ID, and reports the unprinted file information including the file name information linked or associated with the extracted file ID to the wearable terminal 10. Further, after reporting the unprinted file information, the image forming apparatus 20 disconnects or terminates the connection with the wearable terminal 10. Therefore, the image forming apparatus 20 can preferably performing the new arrival notification to the wearable terminal 10 that is not always connected to the network.

Further, when the image forming apparatus 20 uses BLE (registered trademark) that allows only one of the wearable terminals 10 is connected to the image forming apparatus 20 at one time, the connection with the one wearable terminal 10 is disconnected or terminated when the processing required for the one wearable terminal 10 is completed, and then the image forming apparatus 20 is connected to another registered wearable terminal 10, with which the image forming apparatus 20 can be connected to a plurality of the wearable terminals 10 one by one. Further, when the image forming apparatus 20 uses BLE (registered trademark) having an limited capacity for embedding information in a broadcast packet, the unprinted file information is transmitted after establishing the connection, in which registering of the terminal ID is performed, and then selecting of a file that a user wants to receive as the unprinted file information is performed, with which the transmission data size can be reduced, and thereby the transmission data can be transmitted without consideration to the transmission data size. Further, the image forming apparatus 20 can transmit the advertisement packet without including user-specific information, and after establishing the connection with the wearable terminal 10, the image forming apparatus 20 encodes the transmission data, and decodes the received encoded data, with which information security can be maintained.

(Second Embodiment)

In the above described first embodiment, when the unprinted file information including the unprinted file name information is reported to the wearable terminal 10, and any one of the file information displayed on the unprinted file information screen is selected, the login request and the login processing using the terminal ID are performed, and then the application activation request and the application activation processing are performed. Hereinafter, a description is given of a configuration that includes file path information indicating a file storage area in the unprinted file information as a second embodiment. In the second embodiment, a description is given of a file operation request and a file operation processing using the file path information.

(Functional Configuration)

Figure 20:
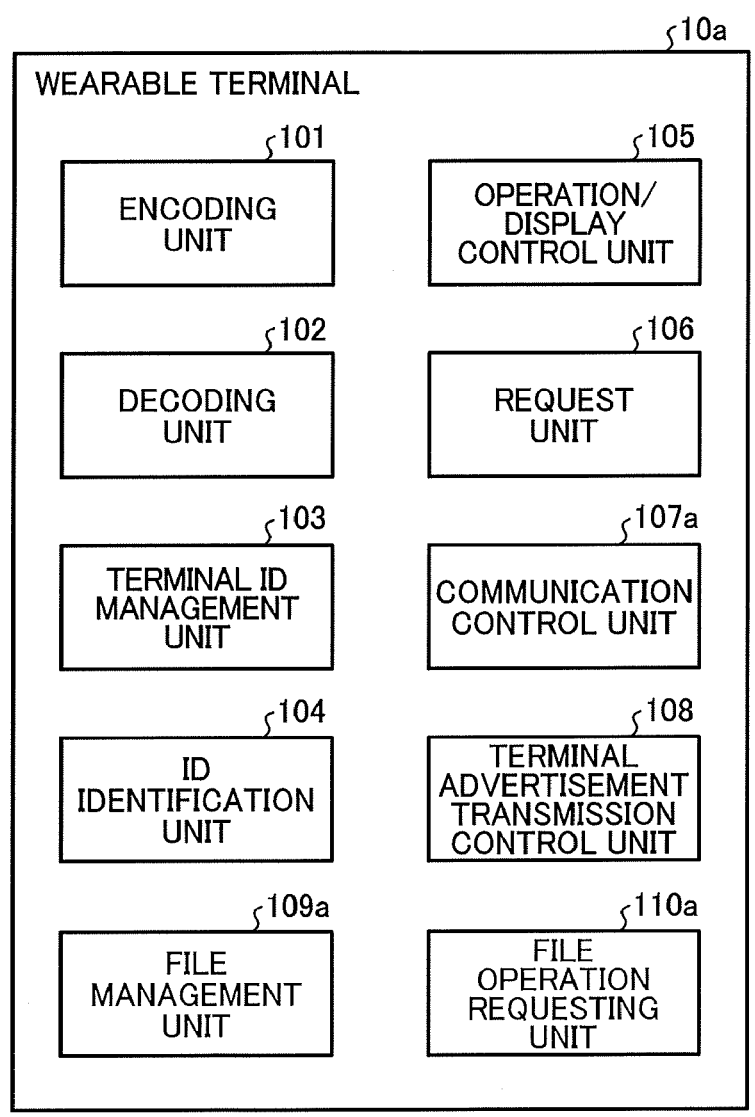
FIG. 20 is an example of a block diagram of a functional configuration of a wearable terminal of a second embodiment.

A description is given of a functional configuration of a wearable terminal 10a of the second embodiment with reference to FIG. 20. FIG. 20 is an example of a block diagram of a functional configuration of the wearable terminal 10a of the second embodiment. In FIG. 20, the same reference numerals are given to the same configurations as those of the wearable terminal 10 of the first embodiment, and a detailed description thereof may be omitted.

As illustrated in FIG. 20, the wearable terminal 10a includes, for example, an encoding unit 101, a decoding unit 102, a terminal ID management unit 103, and an ID identification unit 104. The wearable terminal 10a further includes, for example, an operation/display control unit 105, a request unit 106, a communication control unit 107a, a terminal advertisement transmission control unit 108, a file management unit 109a, and a file operation requesting unit 110a.

The communication control unit 107a controls various communication with an external apparatus such as an image forming apparatus 20a via the communication I/F 16. For example, the communication control unit 107a receives unprinted file information transmitted from the image forming apparatus 20a. In the second embodiment, the unprinted file information includes file name information, and also file path information indicating a file storage area associated with the file name information. In this configuration, the communication control unit 107a receives the file path information of an unprinted file.

The file management unit 109a manages the file path information. For example, the file management unit 109a stores the file path information received by the communication control unit 107a while the ID identification unit 104 stores a specific ID.

The file operation requesting unit 110a requests the file operation processing to the image forming apparatus 20a. For example, when the request unit 106 requests the application activation, and then the operation/display control unit 105 receives a user operation requesting the file operation processing, the file operation requesting unit 110a requests the file operation processing to the image forming apparatus 20a via the communication I/F 16 under the control of the communication control unit 107a. Further, the file operation requesting unit 110a adds the file path information in the execution request of the file operation processing.

The file operation processing includes, for example, a process of displaying a file associated with the file path information as a selectable file when an application activated by the application activation processing displays the file list screen. Further, the file operation processing includes, for example, a process of printing a file associated with the file path information when an application is activated by the application activation processing. Further, the file operation processing includes, for example, a process of generating a preview image of a file associated with the file path information, and a process of displaying the preview image when an application is activated by the application activation processing.

As to which of the file operation processing is to be performed by the image forming apparatus 20a, the file operation processing can be specified by the wearable terminal 10a, or the file operation processing can be specified in advance as described below.

Specifically, when the wearable terminal 10a specifies the file operation processing, the file operation requesting unit 110a adds the file operation information indicating a process that is selected for the operation of requesting the file operation processing in the execution request of the file operation processing. For example, the file operation requesting unit 110a adds the file operation information such as any one of file selection information, printing information, and preview information in the execution request of the file operation processing. The file selection information is one of the file operation information indicating a process of displaying a file associated with the file path information as a selectable file when an application activated by the application activation processing displays the a file list screen. The printing information is one of the file operation information indicating a process of printing a file associated with the file path information when an application is activated by the application activation processing. The preview information is one of the file operation information indicating a process of generating a preview image of a file associated with the file path information, and a process of displaying the preview image when an application is activated by the application activation processing. Therefore, the wearable terminal 10a transmits the execution request of the file operation processing including any one of the file operation information selected by the user operation, and the file path information to the image forming apparatus 20*a*.

By contrast, when the file operation processing is specified in advance, the file operation requesting unit 110*a* transmits a request of the file operation processing including the file path information alone. When the file operation processing is specified in advance, a user specifies the file operation information of the file operation processing at any timing such as when registering the terminal ID. With this configuration, the file operation information of the file operation processing can be registered to the image forming apparatus 20*a* by associating the file operation information of the file operation processing with the terminal ID and the user ID. Specifically, when the image forming apparatus 20*a* receives a request of the file operation processing including the file path information from the wearable terminal 10*a* of one user, the image forming apparatus 20*a* performs the file operation processing matched to the registered file operation information. In other words, when the execution request of the file operation processing does not include the file operation information, the image forming apparatus 20*a* performs the file operation processing matched to the registered file operation information.

Figure 21:
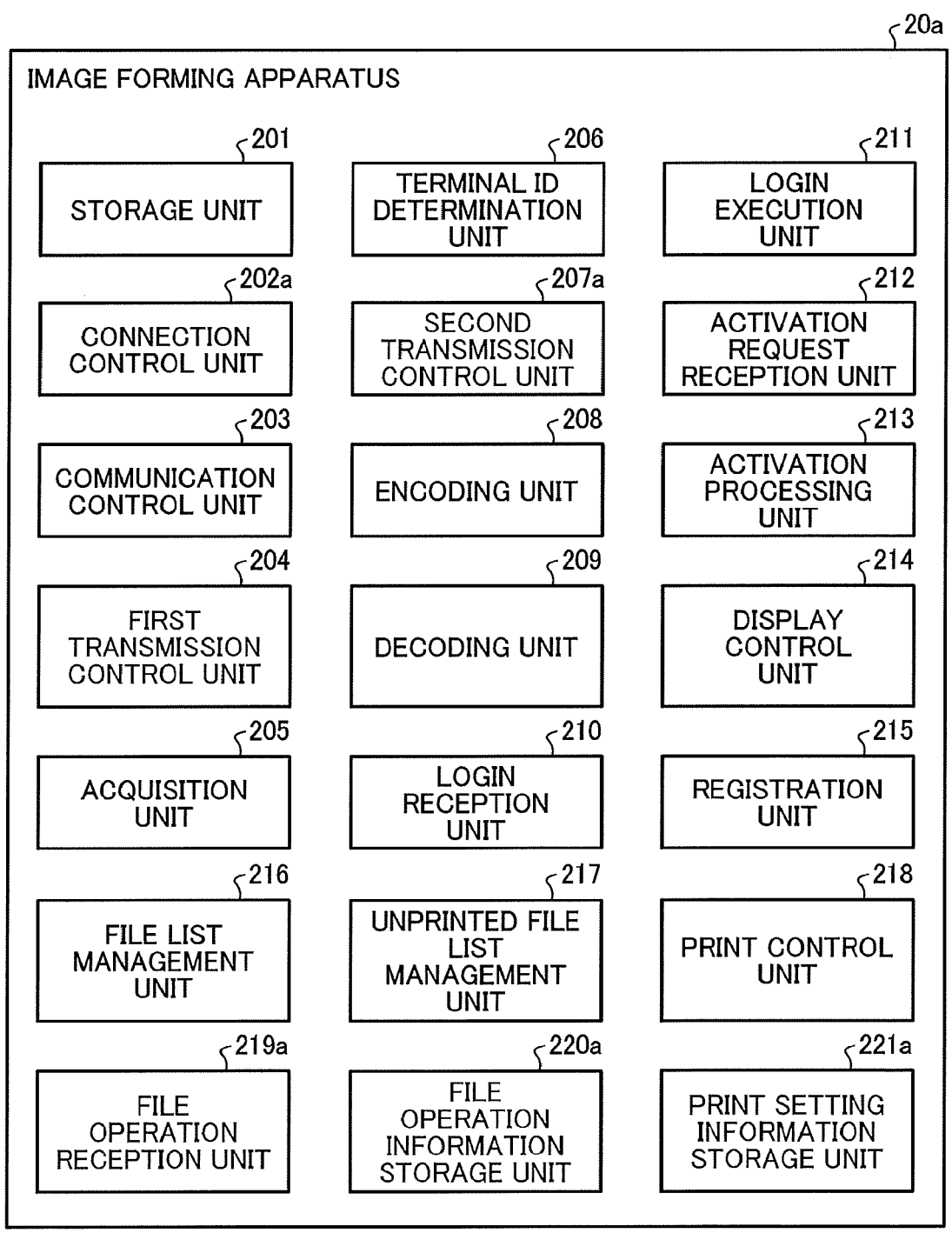
FIG. 21 is an example of a block diagram of a functional configuration of an image forming apparatus of the second embodiment.

A description is given of a functional configuration of the image forming apparatus 20*a* of the second embodiment with reference to FIG. 21. FIG. 21 is an example of a block diagram of a functional configuration of the image forming apparatus 20*a* of the second embodiment. In FIG. 21, the same reference numerals are given to the same configurations as those of the image forming apparatus 20 of the first embodiment, and a detailed description thereof may be omitted.

As illustrated in FIG. 21, the image forming apparatus 20*a* includes, for example, a storage unit 201, a connection control unit 202*a*, a communication control unit 203, a first transmission control unit 204, an acquisition unit 205, and a terminal ID determination unit 206, and a second transmission control unit 207*a*. Further, the image forming apparatus 20*a* includes, for example, an encoding unit 208, a decoding unit 209, a login reception unit 210, a login execution unit 211, an activation request reception unit 212, an activation processing unit 213, and a display control unit 214. Further, the image forming apparatus 20*a* includes, for example, a registration unit 215, a file list management unit 216, an unprinted file list management unit 217, a print control unit 218, a file operation reception unit 219*a*, a file operation information storage unit 220*a*, and a print setting information storage unit 221*a*.

The second transmission control unit 207*a* transmits the unprinted file information to the wearable terminal 10*a*. For example, the second transmission control unit 207*a* transmits the unprinted file information including the file name information indicating a file name of a file associated with the extracted file ID, and the file path information indicating a file storage area associated with the extracted file ID to the wearable terminal 10*a*. The second transmission control unit 207*a* transmits the unprinted file information via the communication control unit 203.

The file operation reception unit 219*a* receives an execution request of the file operation processing from the wearable terminal 10*a*, and controls the execution of the file operation processing. For example, after the login execution unit 211 performs the login processing, the file operation reception unit 219*a* receives the execution request of the file operation processing from the wearable terminal 10*a*. The file operation reception unit 219*a* receives the execution request of the file operation processing via the communication control unit 203. As above described, the execution request of the file operation processing includes the file path information and the file operation information, or the file path information alone.

When the file operation reception unit 219*a* receives the execution request of the file operation processing including the file path information and the file operation information from the wearable terminal 10*a*, the file operation reception unit 219*a* controls the execution of the file operation processing matched to the received file path information and the received file operation information. The file operation information included in the execution request of the file operation processing is information selected at the wearable terminal 10*a*. For example, the file operation information can be any one of the file selection information, the printing information, and the preview information.

Further, when the file operation reception unit 219*a* receives the execution request of the file operation processing including the file path information alone from the wearable terminal 10*a*, the file operation reception unit 219*a* controls the execution of the file operation processing matched to the received file path information, and pre-set file operation information. The pre-set file operation information is information stored in the image forming apparatus 20*a* in advance, and specifically stored in the file operation information storage unit 220*a*. The file operation information storage unit 220*a* stores any one of the file selection information, the printing information, and the preview information associated with the terminal ID and the user ID. The file operation reception unit 219*a* refers the file operation information storage unit 220*a* by using the terminal ID and the user ID of the wearable terminal 10*a* that has requested the execution of the file operation processing to acquire the file operation information. Then, the file operation reception unit 219*a* performs the file operation processing matched to the file path information and the acquired file operation information.

Further, even if the file operation information storage unit 220*a* stores the file operation information in advance, if the file operation information is selected at the wearable terminal 10*a*, and the execution request of the file operation processing includes the file operation information, the file operation processing matched to the file operation information selected at the wearable terminal 10*a* can be performed with a higher priority. As above described, when the execution request of the file operation processing does not include the file operation information, the file operation information stored in the file operation information storage unit 220*a* can be used. Therefore, when the execution request of the file operation processing is to be transmitted from the wearable terminal 10*a*, a screen used for deter mining whether the file operation information is specified or not at the wearable terminal 10*a* can be displayed on the display of the wearable terminal 10*a*.

Further, when the file path information received from the wearable terminal 10*a* is invalid, the file operation reception unit 219*a* controls displaying of information indicating that the file operation processing cannot be performed by using the display control unit 214, in which the display control unit 214 controls the displaying of information. In this configuration, when the file operation reception unit 219*a* receives the file path information, the file operation reception unit 219*a* determines or checks whether a file associated with the file path information exists. In this processing, if the concerned file was already deleted, a file name of the concerned file was already changed, or the concerned file was already transferred, the file operation processing cannot be continued, in which the file operation reception unit 219a displays the information indicating that the file operation processing cannot be performed by using the display control unit 214.

The connection control unit 202a controls a wireless communication connection with the wearable terminal 10a. For example, when the file operation reception unit 219a controls the execution of the file operation processing, the connection control unit 202a disconnects the connection with the wearable terminal 10a.

The print setting information storage unit 221a stores print setting information. For example, the print setting information storage unit 221a stores the print setting information matched to the printing information stored in the file operation information storage unit 220a. As above described, the file operation information storage unit 220a stores any one of the file selection information, the printing information, and the preview information. When the printing information is stored in the file operation information storage unit 220a, the print setting information matched to the printing information can be stored in the print setting information storage unit 221a. Specifically, when the file operation reception unit 219a receives the execution request of the file operation processing including the file path information from the wearable terminal 10a, the file operation reception unit 219a refers the file operation information storage unit 220a to acquire the file operation information. Then, when the acquired file operation information is the printing information, the file operation reception unit 219a acquires the print setting information stored in the print setting information storage unit 221a. Then, the file operation reception unit 219a performs printing of a file associated with the file path information based on the acquired print setting information. For example, a user can specify the print setting information at any timing such as when specifying the file operation information, when registering the terminal ID or the like.

(File Operation Processing)

Figure 22:
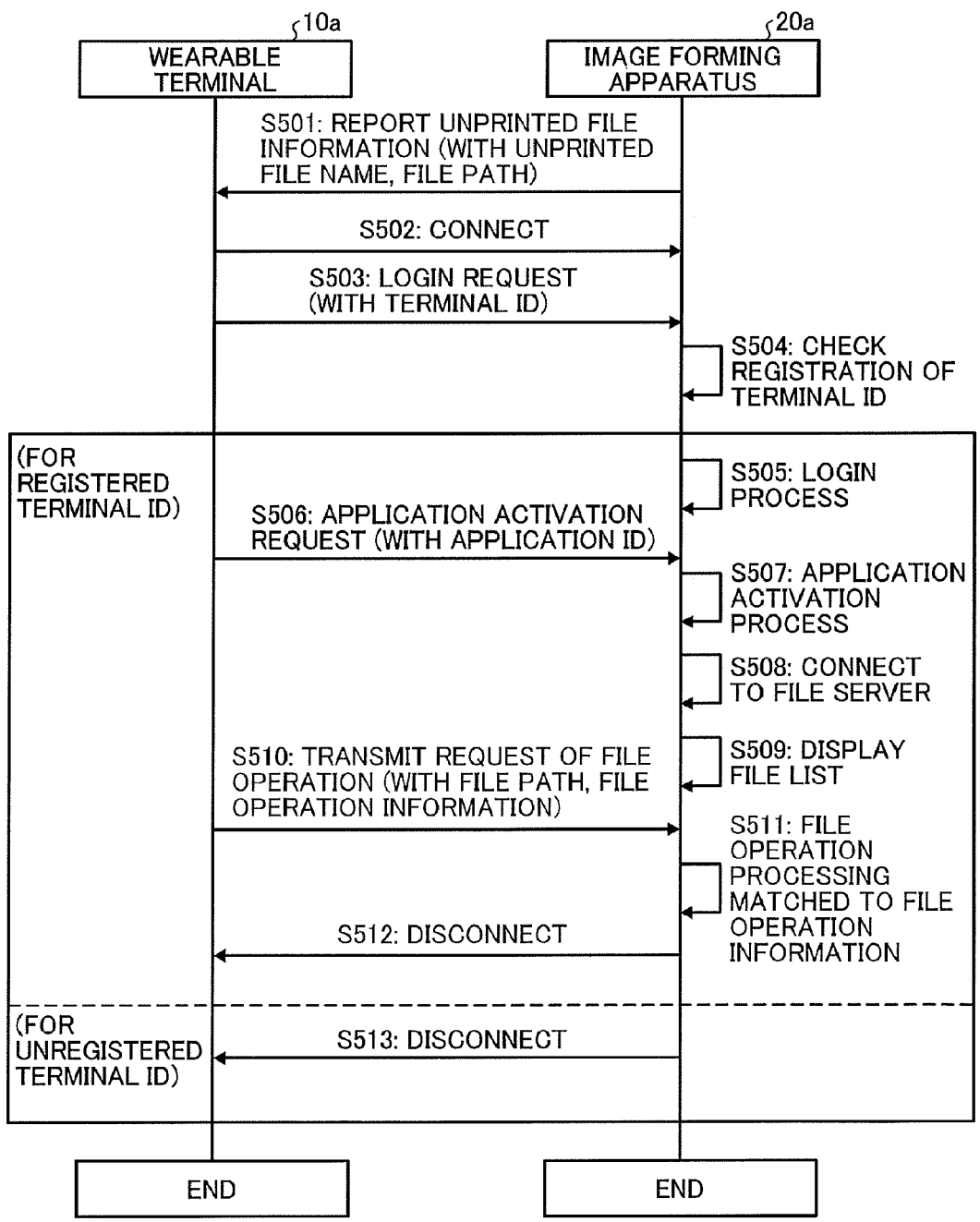
FIG. 22 is an example of a sequential chart illustrating a flow of file operation processing of the second embodiment.

A description is given of a flow of the file operation processing of the second embodiment with reference to FIG. 22. FIG. 22 is an example of a sequential chart illustrating a flow of the file operation processing of the second embodiment. In an example case of FIG. 22, the file operation information is specified at the wearable terminal 10a. Further, in FIG. 22, the description of processes same as the print application activation processing (FIG. 18) of the first embodiment may be omitted. Specifically, steps S502 to S509 are same as steps S402 to S409 of FIG. 18. Further, step S513 is same as step S411 of FIG. 18.

As illustrated in FIG. 22, the image forming apparatus 20a reports the unprinted file information including file name information of a unprinted file, and file path information indicating a file storage area associated with the file name information to the wearable terminal 10a (step S501). Further, the wearable terminal 10a transmits an execution request of the file operation processing including the file path information and the file operation information to the image forming apparatus 20a (step S510). When the image forming apparatus 20a receives the execution request of the file operation processing, the image forming apparatus 20a performs the file operation processing matched to the file operation information for the file associated with the file path information (step S511). Further, after performing the file operation processing, the image forming apparatus 20a disconnects the connection with the wearable terminal 10a (step S512). Further, if the file path information is invalid, the image forming apparatus 20a displays the information indicating that the file operation processing cannot be performed.

Figure 23:
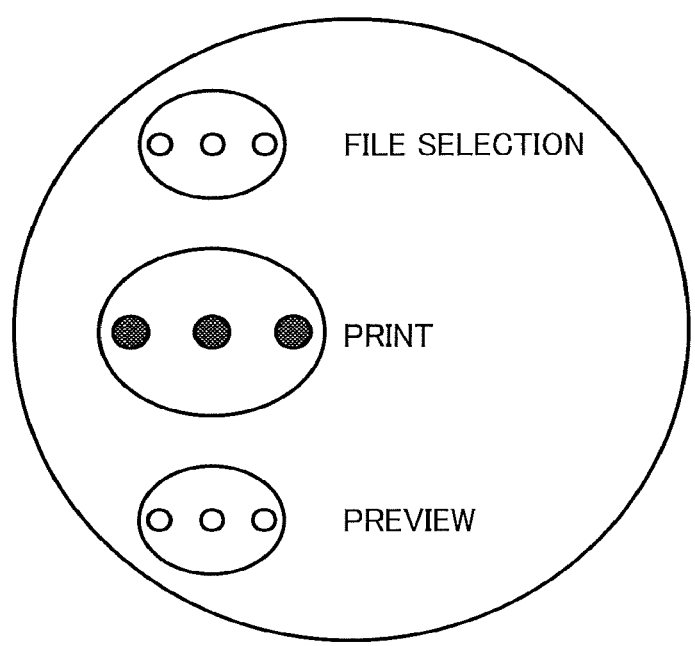
FIG. 23 is an example of a file operation information selection screen of the second embodiment.

FIG. 23 is an example of a file operation information selection screen of the second embodiment. For example, when the wearable terminal 10a is to transmit the execution request of the file operation processing to the image forming apparatus 20a, as illustrated in FIG. 23, the selection screen used for selecting the file operation information (e.g., file selection information, printing information, preview information) can be displayed on the display of the wearable terminal 10a. A user can select any one of the file operation information displayed on the selection screen. With this configuration, the wearable terminal 10a can transmit the execution request of the file operation processing including the file path information, and the selected file operation information to the image forming apparatus 20a.

Figure 24:
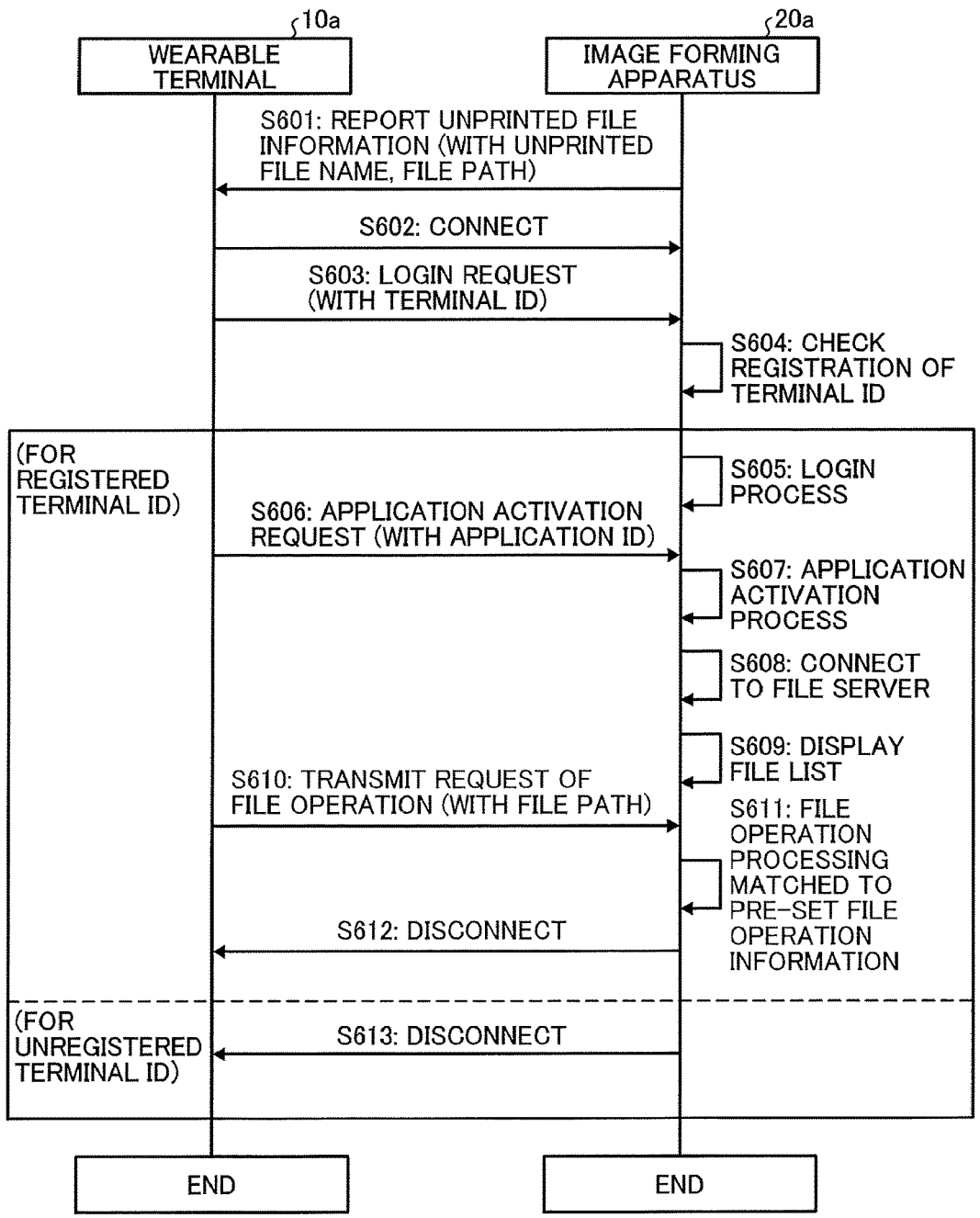
FIG. 24 is another example of a sequential chart illustrating a flow of file operation processing of the second embodiment The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

A description is given of a flow of the file operation processing of the second embodiment with reference to FIG. 24. FIG. 24 is another example of a sequential chart illustrating a flow of the file operation processing of the second embodiment. In an example case of FIG. 24, the file operation information is set in advance. Further, in FIG. 24, the description of processes same as the print application activation processing (FIG. 18) of the first embodiment may be omitted. Specifically, steps S602 to S609 are same as steps S402 to S409 of FIG. 18. Further, step S613 is same as step S411 of FIG. 18.

As illustrated in FIG. 24, the image forming apparatus 20a reports the unprinted file information including file name information of a unprinted file, and file path information indicating a file storage area associated with the file name information to the wearable terminal 10a (step S601). Further, the wearable terminal 10a transmits the execution request of the file operation processing including the file path information to the image forming apparatus 20a (step S610). When the image forming apparatus 20a receives the execution request of the file operation processing, the image forming apparatus 20a acquires the file operation information stored in the file operation information storage unit 220a, and performs the file operation processing matched to the acquired file operation information for a file associated with the file path information (step S611). If the file operation information is the printing information, the image forming apparatus 20a acquires the print setting information from the print setting information storage unit 221a, and performs printing based on the acquired print setting information. Further, after performing the file operation processing, the image forming apparatus 20a disconnects the connection with the wearable terminal 10a (step S612). Further, if the file path information is invalid, the image forming apparatus 20a displays the information indicating that the file operation processing cannot be performed.

(Effect of Second Embodiment)

In the above described second embodiment, the image forming apparatus 20a reports the unprinted file information including the file name information of the unprinted file, and the file path information indicating the file storage area associated with the file name information to the wearable terminal 10a. Then, after performing the login processing of the wearable terminal 10a, and receiving the execution request of the file operation processing including the file path information and the file operation information from the wearable terminal 10a, the image forming apparatus 20a performs the file operation processing matched to the file path information and the file operation information. Then, the image forming apparatus 20a disconnects the connection with the wearable terminal 10a. As a result, the image forming apparatus 20a can easily perform the execution of the request of the file operation processing transmitted from the wearable terminal 10a, which is not always connected to the network.

Further, in the above described second embodiment, when the image forming apparatus 20a stores the file operation information in advance, after performing the login processing of the wearable terminal 10a, and receiving the execution request of the file operation processing including the file path information from the wearable terminal 10a, the image forming apparatus 20a performs the file operation processing matched to the file path information and the pre-set or pre-stored file operation information. Then, the image forming apparatus 20a disconnects the connection with the wearable terminal 10a. As a result, the image forming apparatus 20a can easily perform the execution of the request of the file operation processing transmitted from the wearable terminal 10a, which is not always connected to the network.

Although the embodiments of the image forming apparatuses 20 and 20a have been above described, the image forming apparatuses 20 and 20a can be implemented in various different configurations in addition to the above described embodiments. Therefore, a description is given of an example of (1) configuration, and (2) program of another embodiment.

(1) Configuration

The information including processing procedures, control procedures, specific names, various data, parameters, and the like used in the above description, drawings, and the like can be changed unless otherwise specified. Further, each of the elements configuring the above illustrated apparatus is just examples of the design concept, and does not necessarily have to be physically configured as illustrated in the drawings. In other words, the specific pattern of distribution or integration of the apparatus is not limited to the illustrated drawings, and all or part thereof may be separated or integrated as functional or physical units in view of various processing loads and various usage situations.

(2) Program

Further, the information processing program executed in the image forming apparatuses 20 and 20a may be stored as an installable file format and an executable file format in a computer-readable recording medium such as compact disk read only memory (CD-ROM), a flexible disk (FD), a compact disc-recordable (CD-R), and a digital versatile disk (DVD). Further, the information processing program executed by the image forming apparatuses 20 and 20a can be stored in a computer connected to a network such as the Internet to download the information processing program via the network. Further, the information processing program executed by the image forming apparatuses 20 and 20a can be provided or distributed via the network such as the Internet. Further, the information processing program executed in the image forming apparatuses 20 and 20a can be stored in a ROM in advance.

The information processing program executed by the image forming apparatus 20 includes modules such as the connection control unit 202, the first transmission control unit 204, the acquisition unit 205, the terminal ID determination unit 206, and the second transmission control unit 207. As an actual hardware, the CPU reads the information processing program from the storage medium and executes the information processing program to implement the above units on the main memory, with which the connection control unit 202, the first transmission control unit 204, the acquisition unit 205, the terminal ID determination unit 206, and the second transmission control unit 207 can be implemented on the main memory.

Conventional technologies have problems such as it is difficult to transmit a new arrival notification to a user terminal not always connected to a network. Lately, wearable terminals are available, and users of the wearable terminals wants to receive the new arrival notification. However, when the wearable terminals are connected to the network at all times like other terminals such as a desktop terminal, power supply becomes a problems because of limited capacity of batteries installed in the wearable terminals.

As to the above described embodiment, the new arrival notification can be suitably reported to a user terminal not always connected to a network, in which the user terminal such as the wearable terminal can receive the new arrival notification without problems of conventional technologies.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU can be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus."

What is claimed is:

1. An image forming apparatus, connectable to a user terminal, comprising;
    a memory to store terminal identification information for identifying the user terminal, and file identification information for identifying at least one file printable by the image forming apparatus; and
    circuitry to
    report file information including information on the file printable by the image forming apparatus to the user terminal, acquire terminal identification information of the user terminal from the user terminal as a response to the reporting of the file information, determine whether the terminal identification information acquired from the user terminal matches the terminal identification information stored in the memory, and report the file identification information of the at least one file to the user terminal based on a determination that the terminal identification information acquired from the user terminal matches the terminal identification information stored in the memory.

2. The image forming apparatus of claim 1,
wherein the circuitry receives the file printable by the image forming apparatus from a server that manages the file.

3. The image forming apparatus of claim 1, wherein the circuitry reports the file information to the user terminal depending on print history information of the file printable by the image forming apparatus.

4. The image forming apparatus of claim 1,
wherein the circuitry controls a connection with the user terminal by wireless communication,
wherein the circuitry starts the connection with the user terminal when the circuitry receives a connection request from the user terminal that has received the file information,
wherein the circuitry receives unprinted file information request including the terminal identification information from the user terminal after starting the connection with the user terminal, and acquires the terminal identification information included in the unprinted file information request.

5. The image forming apparatus of claim 4,
wherein when a file that is not printed for a given time period or more exits in a server that manages one or more files, the circuitry transmits the file information including information indicating that the file not printed for the given time period or more exits to the user terminal.

6. The image forming apparatus of claim 4,
wherein the memory further stores update date information indicating an update date of the file, and printed date information indicating a printed date of the file in association with the terminal identification information and the file identification information, for each user identification information for identifying each user that uses the user terminal,
wherein the circuitry is configured to
receive a log-in request including the terminal identification information from the user terminal that has received the unprinted file information,
perform login processing to allow login of the user terminal by using the user identification information associated with the terminal identification information when the circuitry determines that the terminal identification information acquired from the user terminal matches the terminal identification information stored in the memory,
receive an application activation request including application identification information for identifying an application from the user terminal that logs in, and
perform application activation processing to activate the application identified with the application identification information,
wherein the circuitry starts to establish the connection with the user terminal in response to the log-in request received from the user terminal that has received the unprinted file information, and disconnects the connection with the user terminal in response to starting of the application activation processing.

7. The image forming apparatus of claim 6,
wherein the circuitry transmits the file information to the user terminal to receive a registration request for requesting registration of the terminal identification information from the user terminal,
where when the circuitry acquires the terminal identification information of the user terminal from the user terminal as a response of transmission of the file information, the circuitry displays a screen for inputting the user identification information, and a screen for selecting a file to be reported as the unprinted file information,
wherein after the circuitry verifies the user identification information of the user terminal successfully, the circuitry registers the user identification information, the acquired terminal identification information, the file identification information of the selected file, the update date information of the selected file, and the printed date information of the selected file, respectively, in the memory in association with one another.

8. The image forming apparatus of claim 4,
wherein the memory further stores update date information indicating an update date of the file, and printed date information indicating a printed date of the file in association with the terminal identification information and the file identification information, for each user identification information for identifying each user that uses the user terminal,
wherein the circuitry is configured to
report the unprinted file information further including file path information indicating a file storage area of the file associated with the file identification information extracted from the memory to the user terminal,
receive a log-in request including the terminal identification information from the user terminal that has received the unprinted file information,
perform login processing to allow login of the user terminal by using the user identification information associated with the terminal identification information when the circuitry determines that the terminal identification information acquired from the user terminal matches the terminal identification information stored in the memory,
receive an application activation request including application identification information for identifying an application from the user terminal that logs in, and
perform application activation processing to activate the application identified with the application identification information,
receive file path information and file operation information indicating a process for the file associated with the file path information from the user terminal after performing the login processing, and
perform file operation processing matched to the received file path information and file operation information,
wherein the circuitry starts to establish the connection with the user terminal in response to the log-in request received from the user terminal that has received the unprinted file information, and disconnects the connection with the user terminal in response to starting of the application activation processing.

9. The image forming apparatus of claim 8, wherein the file operation information received at the circuitry is selected at the user terminal.

10. The image forming apparatus of claim 4,
wherein the memory further stores update date information indicating an update date of the file, and printed date information indicating a printed date of the file in association with the terminal identification information and the file identification information, for each user identification information for identifying each user that uses the user terminal,
wherein the circuitry is configured to
report the unprinted file information further including file path information indicating a file storage area of the file associated with the file identification information extracted from the memory to the user terminal,
receive a log-in request including the terminal identification information from the user terminal that has received the unprinted file information,
perform login processing to allow login of the user terminal by using the user identification information associated with the terminal identification information when the circuitry determines that the terminal identification information acquired from the user terminal matches the terminal identification information stored in the memory,
receive an application activation request including application identification information for identifying an application from the user terminal that logs in, and
perform application activation processing to activate the application identified with the application identification information,
receive file path information from the user terminal after performing the login processing, and
perform file operation processing matched to the received file path information and file operation information set for the image forming apparatus in advance,
wherein the circuitry starts to establish the connection with the user terminal in response to the log-in request received from the user terminal that has received the unprinted file information, and disconnects the connection with the user terminal in response to starting of the application activation processing.

11. The image forming apparatus of claim 8, wherein the file operation information includes at least one of
file selection information used for displaying the file associated with the file path information as a selectable file on a file list screen when the application activated by the application activation processing displays the file list screen,
printing information used for printing the file associated with the file path information when the application is activated by the application activation processing, and
preview information used for generating a preview image of the file associated with the file path information and displaying the preview image when the application is activated by the application activation processing.

12. The image forming apparatus of claim 1,
wherein the circuitry controls a connection with the user terminal by wireless communication,
wherein the circuitry acquires the terminal identification information included in a connection waiting report, indicating that the user terminal is waiting the connection, transmitted from the user terminal that has received the file information,
wherein the circuitry establishes the connection with the user terminal and then reports unprinted file information including file name information associated with the file identification information of an unprinted file to the user terminal.

13. The image forming apparatus of claim 1,
wherein the circuitry reports the file information including file identification information for identifying the file information to the user terminal, and
wherein the user terminal determines whether the user terminal requests reporting of the unprinted file from the circuitry to the user terminal based on the file identification information included in the file information that is already reported to the user terminal from the circuitry.

14. A method of processing information by an image forming apparatus, connectable to a user terminal, the method comprising:
storing, in a memory, terminal identification information for identifying the user terminal, and file identification information for identifying at least one file printable by the image forming apparatus;
reporting file information including information on the file printable by the image forming apparatus to the user terminal;
acquiring terminal identification information of the user terminal from the user terminal as a response of reporting the file information to the user terminal;
determining whether the terminal identification information acquired from the user terminal matches the terminal identification information stored in the memory; and
reporting the file identification information of the at least one file to the user terminal based on a determination that the terminal identification information acquired from the user terminal matches the terminal identification information stored in the memory.

15. A system comprising:
a user terminal; and
an image forming apparatus connectable to the user terminal, the image foiling apparatus including:
a memory to store terminal identification information for identifying the user terminal, and file identification information for identifying at least one file printable by the image forming apparatus; and
circuitry to
report file information including information on the file printable by the image forming apparatus to the user terminal,
acquire terminal identification information of the user terminal from the user terminal as a response to the reporting of the file information,
determine whether the terminal identification information acquired from the user terminal matches the terminal identification information stored in the memory, and
report the file identification information of the at least one file to the user terminal based on a determination that the terminal identification information acquired from the user terminal matches the terminal identification information stored in the memory.

16. The system of claim 15,
wherein the circuitry reports the file information including file identification information for identifying the file information to the user terminal,
wherein the user terminal determines whether the user terminal requests reporting of the unprinted file from the circuitry to the user terminal based on the file identification information included in the file information that is already reported to the user terminal from the circuitry.

* * * * *